US012332524B2

United States Patent
Munoz et al.

(10) Patent No.: US 12,332,524 B2
(45) Date of Patent: Jun. 17, 2025

(54) COLOR-PRESERVING VARIABLE TRANSMISSION OPTICAL DEVICE

(71) Applicant: ALPHAMICRON INCORPORATED, Kent, OH (US)

(72) Inventors: Antonio Munoz, Shaker Heights, OH (US); Bahman Taheri, Shaker Heights, OH (US)

(73) Assignee: ALPHAMICRON INCORPORATED, Kent, OH (US)

( * ) Notice: Subject to any disclaimer, the term of this patent is extended or adjusted under 35 U.S.C. 154(b) by 0 days.

(21) Appl. No.: 18/369,843

(22) Filed: Sep. 19, 2023

(65) Prior Publication Data

US 2024/0004245 A1  Jan. 4, 2024

Related U.S. Application Data

(63) Continuation-in-part of application No. PCT/US2022/044310, filed on Sep. 22, 2022.
(Continued)

(51) Int. Cl.
*G02F 1/1347* (2006.01)
(52) U.S. Cl.
CPC ...... *G02F 1/13475* (2013.01); *G02F 2203/01* (2013.01)
(58) Field of Classification Search
CPC ............. G02F 1/13475; G02F 2203/01; G02F 1/13718; G02F 1/13725
See application file for complete search history.

(56) References Cited

U.S. PATENT DOCUMENTS

| 5,212,585 A | 5/1993 | Ning |
| 5,943,104 A | 8/1999 | Moddel et al. |

(Continued)

FOREIGN PATENT DOCUMENTS

| WO | 1997015256 A1 | 5/1997 |
| WO | 2022047371 A1 | 3/2022 |
| WO | 2023014756 A1 | 2/2023 |

OTHER PUBLICATIONS

International Search Report and Written Opinion received for International Application No. PCT/US22/44310, mailed on Jan. 3, 2023, 12 Pages.
(Continued)

*Primary Examiner* — Donald L Raleigh

(57) ABSTRACT

A variable transmission optical device ("VTOD") includes first and second cells in optical communication, each cell having an electro-optic material capable of changing from a state of higher light transmittance to a state of lower light transmittance upon a change of an electric field applied across the electro-optic material. The VTOD is switchable between i) a clear state having chromaticity $C_{CS}$ and a photopic transmission $PT_{CS}$ of at least 20% wherein the first cell and second cell are each in the state of higher light transmission, ii) a first darkened state having chromaticity $C_{D1}$ and a photopic transmission $PT_{D1}$ lower than $PT_{CS}$, and iii) a second darkened state having chromaticity $C_{D2}$ and a photopic transmission $PT_{D2}$ that is lower than $PT_{D1}$. $C_{D1}$ and $C_{D2}$ each fall within chroma 2 when their respective PT values correspond to a Munsell value of 5 or less.

29 Claims, 9 Drawing Sheets

Related U.S. Application Data

(60) Provisional application No. 63/246,940, filed on Sep. 22, 2021.

(56) References Cited

U.S. PATENT DOCUMENTS

| | | | |
|---|---|---|---|
| 6,214,990 | B1 | 4/2001 | Tanaka et al. |
| 6,999,220 | B2 | 2/2006 | Kosa et al. |
| 7,102,602 | B2 | 9/2006 | Kim et al. |
| 7,567,306 | B2 | 7/2009 | Park et al. |
| 7,811,482 | B2 | 10/2010 | Miller et al. |
| 8,016,415 | B2 | 9/2011 | Figler et al. |
| 8,562,130 | B2 | 10/2013 | Kosa et al. |
| 8,736,805 | B2 | 5/2014 | Borenstein et al. |
| 9,034,457 | B2 | 5/2015 | Su et al. |
| 9,102,652 | B2 | 8/2015 | Sukhomlinova et al. |
| 9,116,370 | B2 | 8/2015 | Taheri et al. |
| 9,130,097 | B2 | 9/2015 | Taheri et al. |
| 9,134,551 | B2 * | 9/2015 | Sukhomlinova ...... G02F 1/0045 |
| 9,200,203 | B2 | 12/2015 | Sukhomlinova et al. |
| 9,303,209 | B2 | 4/2016 | Munoz et al. |
| 9,304,333 | B2 | 4/2016 | Taheri |
| 9,335,565 | B2 | 5/2016 | Miller et al. |
| 9,513,524 | B2 | 12/2016 | Soto et al. |
| 9,869,887 | B2 | 1/2018 | Taheri et al. |
| 9,918,508 | B2 | 3/2018 | Ryan et al. |
| 10,095,052 | B2 | 10/2018 | Bhatta et al. |
| 10,310,349 | B2 | 6/2019 | Taheri et al. |
| 10,401,690 | B2 | 9/2019 | Baker et al. |
| 10,914,991 | B2 | 2/2021 | Miller et al. |
| 1,106,184 | A1 | 8/2021 | Bergh et al. |
| 11,086,184 | B1 * | 8/2021 | Bergh ................... E06B 3/6722 |
| 11,194,208 | B2 | 12/2021 | Soto et al. |
| 11,435,610 | B2 | 9/2022 | Miller et al. |
| 11,500,255 | B2 | 11/2022 | Taheri et al. |
| 2005/0036077 | A1 * | 2/2005 | Khan ................. G02F 1/13473 349/36 |
| 2008/0246900 | A1 | 10/2008 | Taheri et al. |
| 2016/0070132 | A1 * | 3/2016 | Soto .................... G02F 1/13725 349/193 |
| 2017/0276960 | A1 | 9/2017 | Osterman et al. |
| 2018/0164627 | A1 | 6/2018 | Oh |
| 2018/0224689 | A1 | 8/2018 | Demiglio et al. |
| 2019/0107736 | A1 * | 4/2019 | Gutierrez ............... G02C 7/049 |
| 2019/0306386 | A1 * | 10/2019 | Akkaya ............... G02F 1/13473 |
| 2022/0100005 | A1 | 3/2022 | Balasubramanian et al. |
| 2023/0175139 | A1 | 6/2023 | Fouliard et al. |
| 2023/0314883 | A1 | 10/2023 | Taheri et al. |
| 2024/0077777 | A1 | 3/2024 | Taheri et al. |

OTHER PUBLICATIONS

Farnsworth, "Effects of colored lenses upon color discrimination", by D. Farnsworth in MRL Color Vision Report No. 9., Sep. 3, 1945, 22 Pages.

Newhall et al., "Final Report of the O.S.A. Subcommittee on the Spacing of the Munsell Colors" Journal of the Optical Society of America, Vo. 33, No. 7, Jul. 1943, pp. 385-418.

Specification MIL-PRF-32432A, Performance Specification Military Combat Eye Protection (MCEP) System, published Sep. 11, 2018, 63 Pages.

Standard ANSI C78.377 "Electric Lamps—Specifications for the Chromaticity of Solid-state Lighting Products" 2015, 26 Pages.

Standard ANSI-IES TM-30-20 "Technical Memorandum: IES Method for Evaluating Light Source Color Rendition—An American National Standard" May 2021, 74 Pages.

Royer, "Analysis of color rendition specification criteria." Light-Emitting Devices, Materials, and Applications. vol. 10940. International Society for Optics and Photonics, 2019, 18 Pages.

Royer, "Tutorial: Background and Guidance for Using the ANSI/IES TM-30 Method for Evaluating Light Source Color Rendition", LEUKOS, vol. 18, No. 2, 2022, pp. 191-231.

Soto, "Modeling and Characterization of Dye-Doped Guest-Host Liquid Crystal Eyewear" Dissertation, Nov. 2015, 149 pages.

Extended European Search Report from EP Application No. 22873553.6 dated Feb. 6, 2025, 11 pages.

Uchida et al., "Bright dichroic guest-host LCDs without a polarizer", Proceedings of the Society of Information Display, vol. 22, No. 1, Jan. 1981, pp. 41-46.

Wang et al., "All-optical polarization-independent diffraction in dye-doped cholesteric liquid crystal", Journal of Materials Science, vol. 17, No. 5, May 2006, pp. 385-391.

* cited by examiner

COLOR-PRESERVING VARIABLE TRANSMISSION OPTICAL DEVICE

CROSS-REFERENCE TO RELATED APPLICATIONS

This application is a Continuation-in-Part of PCT/US22/44310, filed on Sep. 22, 2022, which claims priority to, and any other benefit of, U.S. Provisional Patent Application Ser. No. 63/246,940 entitled MULTI-COLOR VARIABLE TRANSMISSION OPTICAL DEVICE, Filed Sep. 22, 2021, the entire disclosures of which are fully incorporated herein by reference.

TECHNICAL FIELD

The present disclosure relates to optical devices, particularly variable transmissive optical devices that may be reversibly switched between clear and multiple darkened states without substantial changes in chromaticity.

BACKGROUND

Variable transmission optical devices (glasses, goggles, visors, windows, sensors, filters, cameras . . . etc.) that can quickly change between a high-transmission "clear" state and a low-transmission "dark" state have many advantages over fixed transmission devices. An especially useful feature is the ability to make this quick change occur on demand, whether manually, at the touch of a button by the user, or automatically, under the control of a light sensor and an electronic circuit.

For some applications, it is important that the relative color of a scene does not change significantly when the device is moved between clear and various darkened states. For example, electronically variable neutral density filters used in photography or cinematography should not substantially shift the so-called white point or chromaticity when darkening down. The human visual system in particular is very sensitive to sudden changes (even small changes) in hue in a scene's white point.

Thus, there is a need to provide a variable transmission optical system (e.g., filters, lenses, goggles, visors, face shields, windows, windshields, AR or VR glasses, or the like) that can achieve multiple different levels of darkness with reasonable preservation of hue.

SUMMARY

In accordance with some embodiments, a variable transmission optical device ("VTOD") includes first and second cells. The first cell includes a first electro-optic material provided between a first pair of substrates, wherein the first electro-optic material is capable of changing from a state of higher light transmittance to a state of lower light transmittance in a first wavelength region upon a change in a first electric field applied across the first electro-optical material. The second cell is in optical communication with the first cell, and includes a second electro-optic material provided between a second pair of substrates, wherein the second electro-optic material is capable of changing from a state of higher light transmittance to a state of lower light transmittance in a second wavelength region upon a change in a second electric field applied across the second electro-optical material. The VTOD is switchable between i) a clear state having chromaticity $C_{CS}$ and a photopic transmission $PT_{CS}$ of at least 20% wherein the first cell and second cell are each in the state of higher light transmission, ii) a first darkened state having chromaticity $C_{D1}$ and a photopic transmission $PT_{D1}$ lower than $PT_{CS}$, and iii) a second darkened state having chromaticity $C_{D2}$ and a photopic transmission $PT_{D2}$ that is lower than $PT_{D1}$. As characterized by Munsell color space i) $PT_{D1}$ corresponds to a Munsell value $MV_{D1}$, ii) $PT_{D2}$ corresponds to a Munsell value $MV_{D2}$, ii) $C_{D1}$ falls within chroma 2 when $MV_{D1}$ is 5 or less, and iv) $C_{D2}$ falls within chroma 2 when $MV_{D2}$ is 5 or less.

In accordance with some other embodiments, a method of operating a variable transmission optical device ("VTOD") having first and second cells is provided. The first cell includes a first electro-optic material provided between a first pair of substrates, wherein the first electro-optic material is capable of changing from a state of higher light transmittance to a state of lower light transmittance in a first wavelength region upon a change in a first electric field applied across the first electro-optical material. The second cell is in optical communication with the first cell, and includes a second electro-optic material provided between a second pair of substrates, wherein the second electro-optic material is capable of changing from a state of higher light transmittance to a state of lower light transmittance in a second wavelength region upon a change in a second electric field applied across the second electro-optical material. The method includes changing at least the second electric field to switch the VTOD from a clear state having chromaticity $C_{CS}$ and a photopic transmission $PT_{CS}$ of at least 20% to a first darkened state having chromaticity $C_{D1}$ and a photopic transmission $PT_{D1}$ lower than $PT_{CS}$. As characterized by Munsell color space, $PT_{D1}$ corresponds to a Munsell value $MV_{D1}$ and $C_{D1}$ falls within chroma 2 when $MV_{D1}$ is 5 or less. The method may further include changing the first electric field or both the first and second electric fields to switch the VTOD to second darkened state having chromaticity $C_{D2}$ and a photopic transmission $PT_{D2}$ that is lower than $PT_{D1}$, wherein $PT_{D2}$ corresponds to a Munsell value $MV_{D2}$ and $C_{D2}$ falls within chroma 2 when $MV_{D2}$ is 5 or less.

DETAILED DESCRIPTION

Figure 1A:
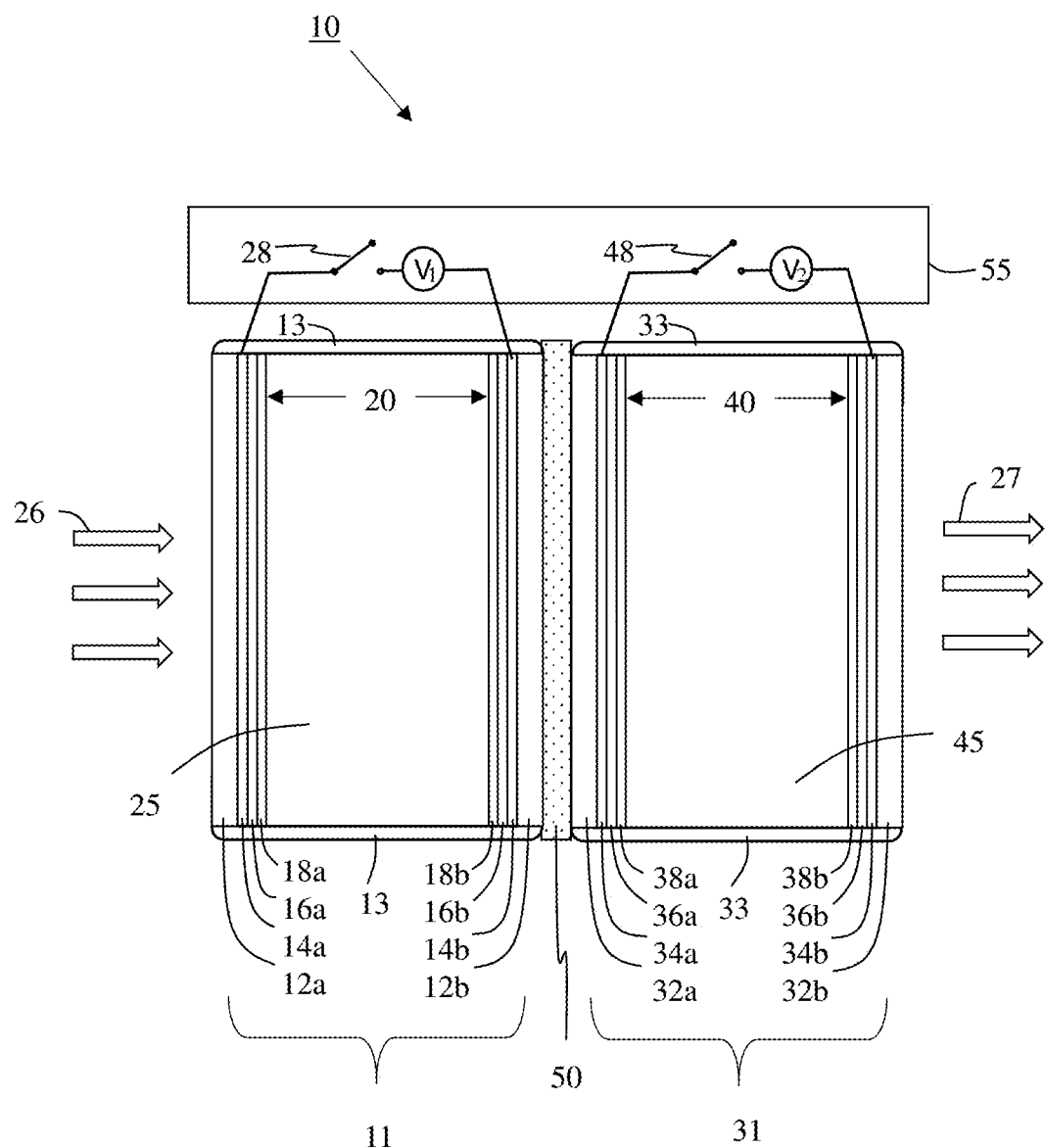
FIG. 1A is a cross-sectional view of a non-limiting example of a Color-Preserving Variable Transmission Optical Device ("CP-VTOD") according to some embodiments.

It should be understood that embodiments include a variety of aspects, which may be combined in different ways. The following descriptions are provided to list elements and describe some of the embodiments of the present application. These elements are listed with initial embodiments; however, it should be understood that they may be combined in any manner and in any number to create additional embodiments. The variously described examples and embodiments should not be construed to limit embodiments of the present application to only the explicitly described systems, techniques, and applications. It is to be understood that the drawings are for purposes of illustrating the concepts of the disclosure and may not be to scale.

The terms "about" and "approximately" can be used to include any numerical value that can vary without changing the basic function of that value. When used with a range, "about" and "approximately" also disclose the range defined by the absolute values of the two endpoints, e.g., "about 2 to about 4" also discloses the range "from 2 to 4."

As used in the specification and in the claims, the terms "comprise(s)," "include(s)," "having," "has," "can," "contain(s)," and variants thereof, as used herein, are intended to be open-ended transitional phrases, terms, or words that require the presence of the named ingredients, components, or steps, and that permit the presence of other ingredients, components, or steps.

The present disclosure may include one or more of the following terms whose meanings may be as described below.

"Absorption" as used herein may define the percentage of light absorbed by the mixture, cell or optical device.

"Absorption band" may define the spectral wavelength wherein absorption occurs.

"Clear state" or "clear state transmission", as used herein, may refer to the state where VTOD exhibits high or maximal light transmittance.

"Darkened state" or "darkened state transmission" may refer to the state where VTOD exhibits reduced light transmittance relative to the clear state.

A "Dichroic (DC) Dye" is a light-absorbing dye molecule that typically has a rodlike shape and displays a unique anisotropy in which its light absorption properties occur parallel ($\alpha_\parallel$) and perpendicular ($\alpha_\perp$) to the molecule, this being characterized by the dichroic ratio, DR=$\alpha_\parallel/\alpha_\perp$. Any molecule that has a dichroic ratio (DR) is one that exhibits "dichroism".

"Dye order parameter" or "$S_{dye}$" refers to the order parameter of the transition dipole of each dichroic dye with respect to the director.

"Dichroic ratio", "average dichroic ratio" or $D_{mix}$ of a dye mixture refers to the dichroic ratio of the guest-host mixture which may contain one or more DC dyes. The mixture dichroic ratio may be measured using the formula for Effective Dichroic Ratio ($D_{eff}$) or Aggregate Effective Dichroic Ratio ($D_{eff-agg}$). Thus, as used herein, $D_{mix}$, $D_{eff}$ or $D_{eff-agg}$ are used interchangeably (depending on which method is used to measure the dichroic ratio) and describe the same parameter.

"Narrow Band Absorption" as used herein, is defined as a spectral absorption band width with a Full Width at Half Max (FWHM) that is less than or equal to 175 nm, or alternatively less than or equal to 165 nm, 155 nm, 120 nm, 80 nm, 60 nm, 50 nm, or 40 nm where the entire spectral absorption band is measured within the visible region of 400-700 nm, or alternatively 380 nm-780 nm.

"Narrow Band Mixture" refers to a guest-host liquid crystal mixture that can be used in a narrow band cell.

Nematic-isotropic transition temperature or $T_{NI}$ is the temperature at which the liquid crystal undergoes the nematic to isotropic transition, which is the transition from the orientationally ordered nematic phase to the totally disordered isotropic phase. As used herein, $T_{NI}$ refers to the nematic-isotropic transition temperature of the guest-host mixture.

"Order parameter of the guest-host mixture" or "$S_{mix}$" refers to the order parameter of the guest-host mixture. The mixture may contain one or more dyes as well as other dopants. The $S_{mix}$ can be measured according to the method described herein, e.g., using the formula for Effective Order Parameter ($S_{eff}$) or Aggregate Effective Order Parameter ($S_{eff-agg}$). As used herein $S_{mix}$, $S_{eff}$ and $S_{eff-agg}$ are used interchangeably (depending on which method is used to measure the order parameter) and describe the same parameter.

"Polarization dependence" is a measure of a material's response to two orthogonal linear polarizations, i.e., where the optical properties of a material experienced by an incident light (such as index of refraction or absorption/transmittance) are dependent on the polarization of the incident light.

"Polarization sensitivity" is the relative measure of the response of the material between the two orthogonal linear polarizations. In ideal, theoretical limit, zero percent (0%) polarization sensitivity refers to a completely polarization insensitive device and a 100% polarization sensitivity refers to a completely polarization sensitive device as obtained using a polarizer.

"Polarizer" refers to a material, layer, or component that absorbs or reflects one polarization of incident light more than the orthogonal polarization.

"Transmission" and "Transmittance" are used interchangeably and mean the percentage of light that is transmitted through a mixture or device.

"Transmission swing" refers to the difference in transmission between the clear state and dark state transmissions. For example, if the clear state transmission is 65% and the dark state transmission is 15%, the transmission swing is 65−15=40%. The transmission swing of an optical device can be measured using equipment such as a "haze-gard plus" device from BYK-Gardner, USA, or equivalent.

"Tint" or "tinted" state refers to a condition where, relative to a clear state, the guest-host mixture exhibits some light absorption which may be narrow band absorption (<175 nm bandwidth) or wide-band absorption (≥175 nm). A tinted state may correspond to a color state, or alternatively, may correspond to a low color chromaticity state.

"Uniform optical retardation" refers to plastic substrates having an optical retardation variation that is less than ±20%. "Optical retardation" is defined as the change in the optical phase experienced by different polarizations of incident light.

"Visible light" refers to a wavelength range of about 400 nm to about 700 nm, or alternatively about 380 nm to about 780 nm.

"Wide band absorption" as used herein, may refer to a spectral absorption band that is greater than 175 nm, and preferably greater than 180 nm, 185 nm, 190 nm, 195 nm or 200 nm, where the entire spectral absorption band is contained within the range of visible wavelengths, typically assumed to be 400 nm-700 nm, or alternatively 380 nm-780 nm. Wide band absorption may in some cases have a low color chromaticity, but in other cases, may have a color.

"Wide Band Cell" refers to a device capable of producing a wide absorption band.

"Wide Band Mixture" refers to a guest-host liquid crystal mixture that can be used in a wide band cell.

Note that the terms "transmittance" and "transmission" may generally be used interchangeably herein.

Optical Device Overview

FIG. 1A is a cross-sectional view of a non-limiting example of a Color-Preserving Variable Transmission Optical Device ("CP-VTOD") according to some embodiments. In some embodiments, CP-VTOD 10 may include a first cell 11 in optical communication with a second cell 31 such that incident light 26 may be modulated by the first cell, by the second cell, or by both the first and second cells, and pass through the device as transmitted light 27. The first and second cells may optionally be separated by layer 50, which may include, for example, an optically transparent adhesive, a polymer film, a glass layer, or an optical article such as a lens, a window, a visor or the like. In some embodiments, layer 50 may be selected to reduce insertion loss associated with interfaces. Note that the designation of "first" and "second" cells is arbitrary and interchangeable, i.e., in embodiments described herein, the second cell may instead first receive the incident light rather than the first cell.

Each cell may include a pair of substrates, 12a, 12b for the first cell, and 32a, 32b for the second cell. As discussed in more detail later, the substrates may be independently selected and include, for example, a polymeric material, a glass, or a ceramic. Each cell may include a pair of transparent conducting layers, 14a, 14b for the first cell, and 34a, 34b for the second cell, which may be provided or coated over each respective substrate surface interior to the cell. In some embodiments, an optional passivation layer (which in some cases may be referred to as an insulating layer or "hard coat"), 16a, 16b, 36a, 36b, may be provided over the respective transparent conducting layer. The passivation layer may include, for example, a non-conductive oxide, sol-gel, polymer, or a composite. An optional alignment layer 18a, 18b, 38a, 38b, may be provided over the passivation layer or the transparent conducting layer. As a non-limiting example, the alignment layer may include polyimide. In some embodiments, the alignment layer may function as a passivation layer. In some embodiments, the alignment layer may be brushed as is known in the art to assist in orienting the electro-optic material, e.g., a LC host, near the surface. In some embodiments, both alignment layers of a cell are brushed. In some embodiments, a cell may include only one brushed alignment layer.

Figure 1B:
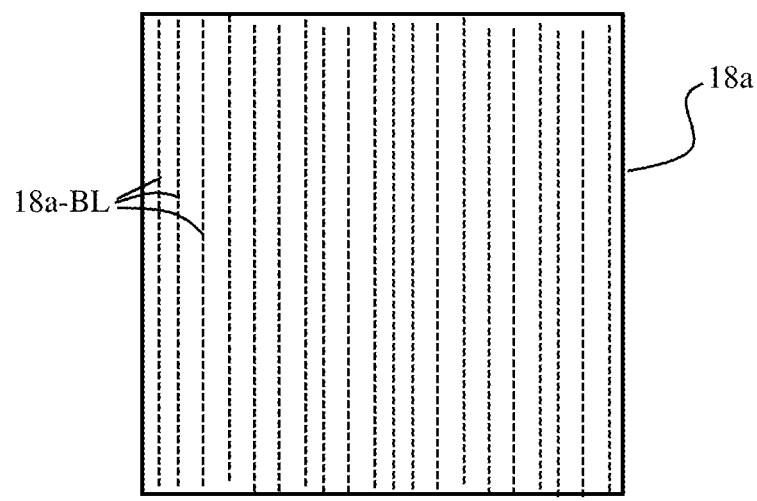
FIGS. 1B and 1C are schematic plan views illustrating the relative orientation of alignment layers between different cells according to some embodiments.
Figure 1C:
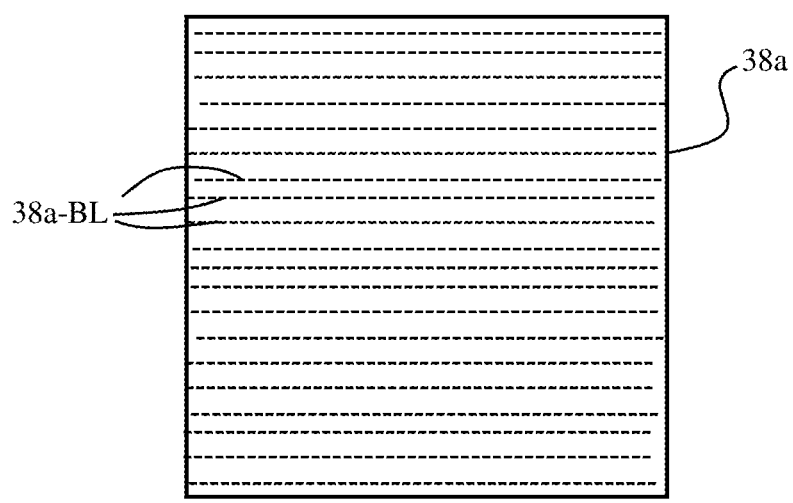

In some embodiments, an alignment layer of the first cell may have an orientation that is that is rotated, e.g., by 70 to 110 degrees, alternatively by 80 to 110 degrees, or alternatively 85 to 95 degrees, relative to an alignment layer of the second cell. For example, FIG. 1B is a schematic plan view of an alignment layer 18a showing alignment brush lines 18a-BL oriented approximately vertically. FIG. 1C is a schematic plan view of an alignment layer 38a showing alignment brush lines 38a-BL oriented approximately horizontally, i.e., at about 90 degrees relative to alignment layer 18a. Such a configuration may in some cases be capable of absorbing more light in its darkened state. While not being bound by theory, a first cell may absorb more of one polarization than the other, but by rotating the alignment, the second cell may be configured to absorb more of that other polarization.

The first cell 11 includes a first electro-optic material 25, e.g., a first liquid crystal guest-host mixture, provided between the first cell's pair substrates 12a, 12b. The first electro-optic material is capable of changing from a state of higher light transmittance to a state of lower light transmittance in a first wavelength region upon a change in a first electric field applied across the first electro-optical material. The first electric field may be changed, for example, by changing the voltage applied between the first cell's pair of transparent conductive layers 14a, 14b. The substrates and any overlying layers define a first cell gap 20. Similarly, second cell 31 includes a second electro-optic material 45, e.g., a second liquid crystal guest-host mixture that may be the same as or different from the first liquid crystal guest-host mixture, provided between the second cell's pair of substrates 32a, 32b. The second electro-optic material is capable of changing from a state of higher light transmittance to a state of lower light transmittance in a second wavelength region, that may be substantially the same as or different from the first wavelength region, upon a change in a second electric field applied across the second electro-optical material. The second electric field may be changed, for example, by changing the voltage applied between the second cell's pair of transparent conductive layers 34a, 34b. These substrates and any overlying layers define a second cell gap 40. Second cell gap 40 may be the same or different than cell gap 20. To aid in maintaining the separation, optional spacers (not shown), such as glass or plastic rods or beads, may be inserted between the respective substrates for each cell.

In some cases, the first and second cell structures may be enclosed by sealing material 13, 33 such as a UV-cured optical adhesive or other sealants known in the art. Sealing material 13 and 33 may be the same or different. FIG. 1 shows the sealing materials of the first and second cells as separate, but in some embodiments, a single common sealing material layer may instead seal both cells. It is to be appreciated that sealing material 13, 33, may be provided anywhere to create a seal for electro optic material 25, 45, between the substrates 12a,12b, 32a, 32b. For example and without limitation, sealing material may be placed between the substrates 12a, 12b, 32a, 32b and any overlying layers. In some embodiments, the sealing material may include spacers for maintaining cell gap 20, 40.

The conducting layers of each cell 14a, 14b, 34a, 34b, may be electrically connected to a controller 55. Controller 55 may include one or more variable voltage supplies which are represented schematically by the encircled $V_1$ and $V_2$, for the first cell and second cell, respectively. FIG. 1A shows a first cell power circuit with its switch 28 open so that no voltage is applied. When switch 28 is closed, a variable voltage or electric field may be applied across liquid crystal guest-host mixture 25. Similarly, a second cell power circuit is shown with its switch 48 in an open position so that no voltage is applied. When switch 48 is closed, a variable voltage or electric field may be applied across liquid crystal guest-host mixture 45. In some embodiments, the electric field applied across the first cell may be independently controlled relative to the electric field applied across the second cell. Independent control may in some cases allow more options in how the VTOD filters light. In some other embodiments, the electric field applied across the first and second cells are commonly controlled, e.g., by simultaneous application of the same voltage profile across each set of electrodes of the first and second cells. In some embodiments, one electrode of the first cell is in electrical communication with one electrode of the second cell, and the other electrode of the first cell is in electrical communication with the other electrode of the second cell. Common control may in some cases be simpler and allow lower cost controllers to be used.

In some embodiments (not shown), rather than including layer 50, the second and first cells may share a substrate, e.g., substrate 12b, such that the transparent conducting layer 34a (and optionally other layers 36a and/or 38a), are provided on the substrate surface opposite to that having transparent conducting layer 14b of the first cell. Such a structure in some cases may reduce possible optical losses. Note that any or all of substrates 12a, 12b, 32a, 32b may be the same or different, any or all transparent conducting layers 14a, 14b, 34a, 34b may be the same or different, any or all of optional passivation layers 16a, 16b, 36a, 36b may be the same or different, and any or all of optional alignment layers 18a, 18b, 38a, 38b may be the same or different. In some embodiments, one or both cells include only one alignment layer.

Electro-Optic Material

An electro-optic material is one capable of changing its light absorption profile upon application of an electric field. In some embodiments, the electro-optic material includes a guest-host system having an LC host and a DC dye (guest) dissolved or dispersed therein, or alternatively a dichroic light absorbing moiety covalently attached to the LC host (all considered a guest-host mixture).

A guest-host system may be used to produce an electro-optical effect that involves a mixture of dichroic dye "guest" and liquid crystal "host" wherein the dichroism is adjusted within a voltage-controllable liquid crystal cell. In an isotropic host, the molecules are randomly oriented, and the effective absorption is a weighted average: $\alpha_{eff}=(2\alpha\perp+\alpha\|)/3$. In an anisotropic LC host material, designed for polarization independent operation, the absorption can be increased to $\alpha_{eff}=(\alpha\perp+\alpha\|)/2$ or decreased to $\alpha\perp$, depending on the desired effect.

In some embodiments, a liquid crystal guest-host includes a mixture of a cholesteric liquid crystal host and a dyestuff material. The dyestuff material may be characterized as having dichroic properties, and as described below, may include a single dye or a mixture of dyes to provide these properties. In some embodiments, the liquid crystal guest-host mixture may be formulated as a "narrow band mixture". In some embodiments, at least one cell 11, 31 includes a narrow band mixture as electro-optic material 25, 45. In some embodiments, both cells include narrow band mixtures that are different from each other. In some embodiments, one cell includes a narrow band mixture, and the other cell includes a wide band mixture. In some embodiments, both cells include a wide band mixtures that may be the same or different from each other. Note that the term "mixture" in the context of guest-host materials is generally used broadly herein, and may refer to a DC moiety covalently attached to the LC host. A guest-host mixture may be, but is not necessarily, a simple combination of separate dye and liquid crystal molecules.

LC Host

In some embodiments, the host includes a chiral nematic or cholesteric liquid crystal material (collectively "CLC") which may have a negative dielectric anisotropy ("negative CLC") or a positive dielectric anisotropy ("positive CLC"). In some embodiments of the CLC, the liquid crystal material is cholesteric, or it includes a nematic liquid crystal in combination with a chiral dopant. A CLC material has a twisted or helical structure. The periodicity of the twist is referred to as its "pitch" ("p"). The orientation or order of the liquid crystal host may be changed upon application of an electric field, and in combination with the dyestuff material, may be used to control or partially control the optical properties of the cell 11, 31. In some embodiments, the CLC may be further characterized by its chirality, i.e., right-handed chirality or left-handed chirality.

A wide variety of CLC materials are available and have potential utility in various embodiments of the present disclosure.

Dyestuff Material

To provide dichroic properties, the dyestuff material generally includes at least one dichroic (DC) dye or mixture of DC dyes. In some cases, the dyestuff material may optionally further include a photochromic (PC) dye or a photochromic-dichroic (PCDC) dye whose light absorbance may be activated by exposure to UV light such as sunlight. In some embodiments, the dyestuff material may further include a small amount of a conventional absorbing dye, e.g., to provide the device with a desired overall hue in the clear state. In some embodiments, the dyestuff material includes substantially only DC dyes.

DC Dyes

Dichroic dyes typically have an elongated molecular shape and exhibit anisotropic absorption. Commonly, the absorption is higher along the long axis of the molecule and such dyes may be referred to as "positive dyes" or dyes exhibiting positive dichroism. Positive DC dyes are generally used herein. However, in some cases, negative DC dyes that exhibit negative dichroism may be used instead. In some embodiments, a DC dye (as measured in a CLC host) may have a dichroic ratio of at least 5.0, alternatively at least 6, 7, 8, 9, 10, 11, 12, 13, 14, 15, 16, 17, 18, 19 or 20.

The level of visible light absorption by the DC dye may be a function of the dye type and the CLC host. In the optical devices of the present disclosure, the apparent absorption of visible light may also be a function of voltage. The orientation or long-range order of the CLC may be a function of electric field or voltage across the cell thickness. A DC dye exhibits some alignment with the CLC host so that application of a voltage may be used to alter the apparent darkness of the cell.

In some embodiments, a DC dye may include a small molecule type of material. In some embodiments, a DC dye may include an oligomeric or polymeric material. The chemical moiety responsible for light absorption may, for example, be a pendent group on a main chain. Multiple DC dyes may optionally be used, for example, to tune the light absorption envelope or to improve overall cell performance with respect to lifetime or some other property. DC dyes may include functional groups that may improve solubility, miscibility with or bonding to the CLC host. Some non-limiting examples of DC dyes may include azo dyes, for example, azo dyes having 2 to 10 azo groups, or alternatively, 2 to 6 azo groups. Other DC dyes are known in the art, such as anthraquinone and perylene dyes. Generally, any molecule with dichroic properties can be used.

Other Cell Features

Substrate

Referring again to FIG. 1A, in some embodiments, the substrate 12a, 12b, 32a, 32b may be independently selected and may include a plastic, a glass, a ceramic, or some other material. Choice of material and its particular properties depends in part on the intended application. For many applications, the substrate should be at least partially transmissive to visible light. In some embodiments, a substrate may have higher than 45% transmission to visible radiation having a wavelength between 400 nm and 700 nm, alternatively, higher than 50%, 60%, 70%, 80%, 90%, or 95% transmission. In some embodiments, the substrate may have high optical clarity so that a person or sensor may clearly see through the CP-VTOD 10. In some embodiments, the substrate may optionally have some color or tint. In some embodiments, the substrate may have an optical coating on the outside of the cell. A substrate may be flexible or rigid.

As some non-limiting examples, a plastic substrate may include a polycarbonate (PC), a polycarbonate and copolymer blend, a polyethersulfone (PES), a polyethylene terephthalate (PET), cellulose triacetate (TAC), a polyamide, p-nitrophenyl butyrate (PNB), a polyetheretherketone (PEEK), a polyethylene naphthalate (PEN), a polyetherimide (PEI), polyarylate (PAR), a polyvinyl acetate, a cyclic olefin polymer (COP) or other similar plastics known in the art. In some non-limiting examples, flexible glass including materials such as Corning® Willow® Glass and the like can be used as a substrate. A substrate may include multiple materials or have a multi-layer structure.

In some embodiments, the thickness of a substrate may be in a range of 10-20 µm, 20-30 µm, 30-40 µm, 40-50 µm, 50-75 µm, 75-100 µm, 100-150 µm, 150-200 µm, 200-250 µm, 250-300 µm, 300-350 µm, 350-400 µm, 400-450 µm, 450-500 µm, 500-600 µm, 600-800 µm, 800-1000 µm, or greater than 1 mm or any combination of ranges thereof.

In some embodiments, the CP-VTOD 10 does not use polarizers.

Transparent Conducting Layer

By "transparent" conducting layer, it is meant that the conducting layer 14a, 14b, 34a, 34b allows at least 45% of incident visible light to pass through. A transparent conducting layer may absorb or reflect a portion of visible light and still be useful. In some embodiments, the transparent conducting layer may include a transparent conducting oxide (TCO) including, but not limited to, ITO, AZO, or FTO. In some embodiments, the transparent conducting layer may include a conductive polymer including, but not limited to, PEDOT:PSS, a poly(pyrrole), a polyaniline, a polyphenylene, or a poly(acetylene). In some embodiments, the transparent conducting layer may include a partially transparent thin layer of metal or metal nanowires, e.g., formed of silver, copper, aluminum, or gold. In some embodiments, the transparent conducting layer may include graphene.

Chromaticity

In some embodiments, the CP-VTOD functions to reduce the intensity of incident illumination without significantly impairing color perception. In some cases, the CP-VTOD may be used under a wide range illumination (natural light, artificial light) and color (scene) conditions. Various metrics and methods may be applied when evaluating the color performance or chromaticities of a filter such as a CP-VTOD. As recognized in the field, the appearance of colors viewed through lenses can be treated by the same techniques which would be used if surface colors were examined under lights of various colors. It does not matter whether the filter is put over the illuminant or over the eye. (See "Effects of colored lenses upon color discrimination", by D. Farnsworth in USNR, MRL Color Vision Report No 9. 3 Sep. 1945, the entire contents of which are incorporated herein by reference for all purposes.)

In accordance with the present disclosure, an CP-VTOD 10 may be configured to have a colorimetrically neutral chromaticity (or have low color chromaticity) in its "clear state", i.e., where both the first cell 11 and the second cell 31 are each in a state of higher light transmission that is at or near their maximum light transmission. In some embodiments, an CP-VTOD 10 may be configured to have a colorimetrically neutral chromaticity (or have low color chromaticity) in a "darkened" state where at least one cell, but optionally both the first cell and second cells, are in a state of lower light transmission. Preferably, the CP-VTOD is capable of providing a colorimetrically neutral chromaticity (or a low color chromaticity) in multiple darkened states, optionally including a colorimetrically neutral chromaticity (or a low color chromaticity) at or near their minimum light transmission (darkest state of the CP-VTOD)

Figure 2A:
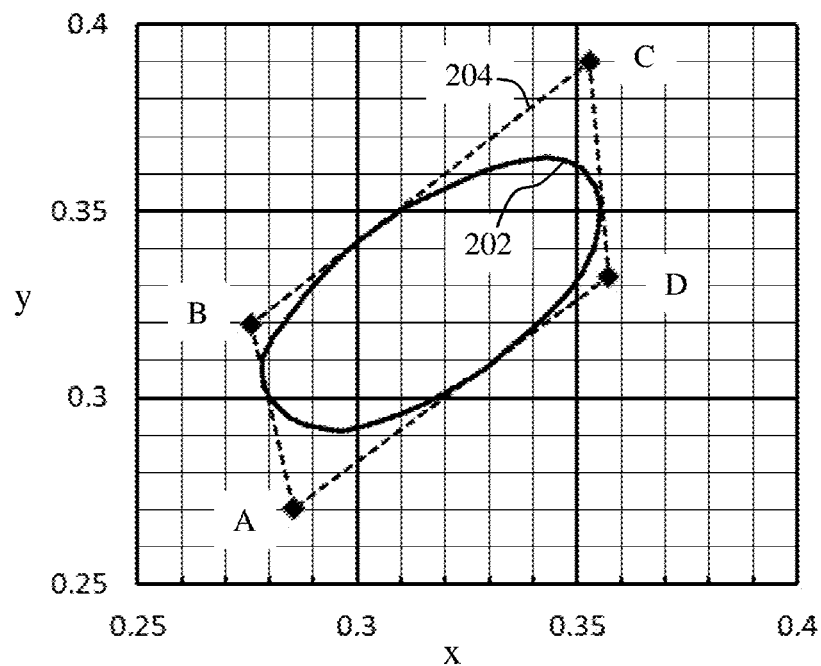
FIGS. 2A and 2B illustrate portions of the CIE 1931 x-y color space chromaticity diagram according to some embodiments.

Chromaticity is an objective specification of the quality of a color regardless of its luminance. Chromaticity coordinates may be calculated from spectrophotometric data and can be represented by the well-known CIE 1931 x-y color space chromaticity diagram. FIG. 2A shows a portion of the chromaticity diagram 200A including generally neutral region 202 (area inside the oval). In the Munsell color system, neutral region 202 corresponds to the equal chroma 2 loci at a Munsell value of 5 (neutral region 202 may be referred to herein simply as chroma 2 at Munsell value 5). In the Munsell color system, a Munsell "value 5" is associated, under Illuminant C, to "the luminous reflectance Y equivalent (percent form)" of about 20%. Additional details of Munsell color system and its correlation to x-y color space can be found in "Final Report of the O.S.A. Subcommittee on the Spacing of the Munsell Colors" by Newhall et al., Journal of the Optical Society of America, Volume 33, Number 7, July, 1943, pages 385-418, the entire contents of which is incorporated by reference for all purposes. Attention is called in particular to Table II on page 406 which lists various Munsell Values from 0 to 10 (in increments of 0.01) and their corresponding luminance reflectance values, Yv (%). For the purpose of evaluating a filter on transmitted light, the Yv (%) values can be used to represent the photopic transmission PT % of the filter. As such, a Munsell value of 5 corresponds to a PT % of 19.8%, a Munsell value of 4 corresponds to a PT % of 12.0%, a Munsell value of 3 corresponds to a PT % of 6.6%, a Munsell value of 2 corresponds to a PT % of 3.1%, and a Munsell value of 1 corresponds to a PT % of 1.2%. It is further noted that neutral region 202 is also similar to that used in some military specifications for light-darkening goggles (e.g., see FIG. 1 of MIL-PRF-32432A, published Sep. 11, 2018, the entire contents of which is incorporated by reference herein for all purposes).

In some embodiments, a low color chromaticity state may be one where the color coordinates x and y fall within neutral region 202 of FIG. 2A, particularly at a PT % of 19.8% or less. In some embodiments, a low color chromaticity state may be one where the x-coordinate is in a range of about 0.27 to about 0.36 and the y-coordinate is in a range of about 0.29 to about 0.37. In another embodiment, a low color chromaticity state may be one where the color coordinates x and y fall within neutral quadrangle 204 defined by points A, B, C, and D (x/y for A, B, C, D=0.286/0.270, 0.276/0.320, 0.353/0.390, and 0.357/0.332, respectively). The sides of quadrangle 204 are parallel to those for the McAdam 7-step quadrangle at 6500K according to standard ANSI C78-377 (which is incorporated by reference herein for all purposes). ANSI C78-377 was used to provide chromaticity specifications for solid state lighting, but is applied herein to define the neutral quadrangle 204, within which light may appear relatively neutral, especially at a PT of 19.8% or less.

A low color chromaticity system in a darkened state may generally appear grey, black or "smoked" color. However, the hue of the system can also be defined in terms of "Chromaticity and Neutrality". These methods of definitions are used in certain military and automotive specifications, including by not limited to MIL-DTL-43511D and MIL-PRF-32432A (previously mentioned), each incorporated by reference herein in its entirety. In some embodiments, a neutral state (one having neutrality) has an average percent deviation of spectral transmittance in a range of 400 nm to 700 nm (alternatively 380 nm to 780 nm) that is less than about 30%, alternatively less than about 20%, 15%, or 12%. In some cases, an average percent deviation of spectral transmittance may be one as defined in MIL-PRF-32432A (published Sep. 11, 2018), e.g., as calculated according to its Table VIII. In some cases, a colorimetrically neutral state may be characterized as having both neutrality and low color chromaticity.

Figure 2B:
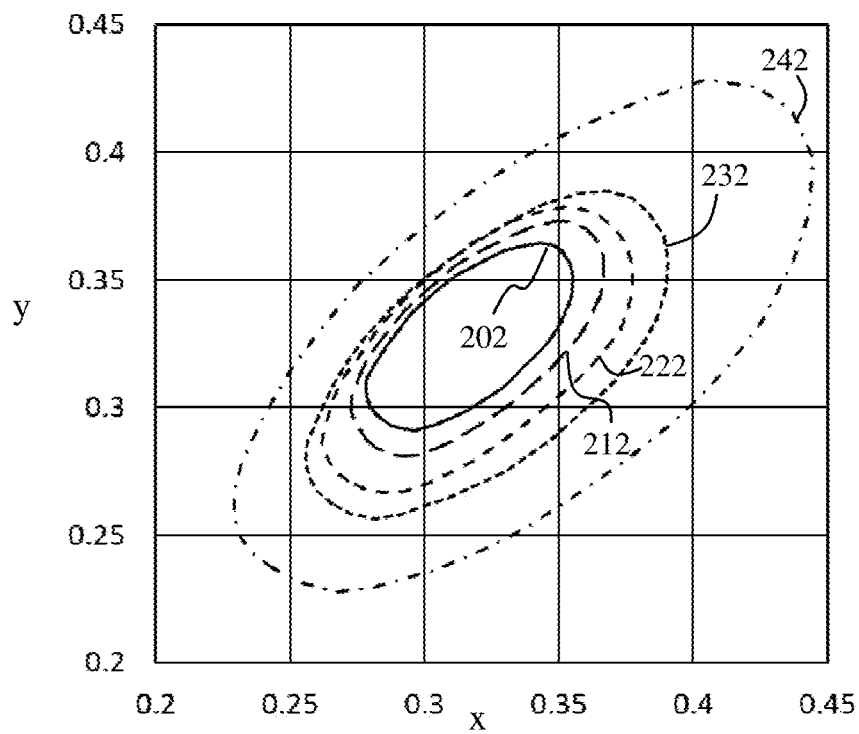

At higher Munsell values (higher "luminance transmittance, Y equivalent (percent form)" associated with higher photopic transmission, PT %), the chroma 2 ellipse becomes smaller because the human eye can more easily discriminate colors that are brighter. Conversely, at lower Munsell values, the chroma 2 ellipse becomes larger. For example, FIG. 2B is another chromaticity diagram 200B showing the same neutral region 202 as previously discussed (chroma 2 at Munsell value 5 (approximately corresponding to PT %=19.8%)), but now also showing neutral regions corresponding to chroma 2 at various Munsell values. In particular, neutral region 212 corresponds to chroma 2 at Munsell value 4 (approximately corresponding to PT %=12.0%), neutral region 222 corresponds to chroma 2 at Munsell value 3 (approximately corresponding to PT %=6.6%), neutral region 232 corresponds to chroma 2 at Munsell value 2 (approximately corresponding to PT %=3.1%), and neutral region 242 corresponds to chroma 2 at Munsell value 1 (approximately corresponding to PT %=1.2%).

In some embodiments, a low chromaticity color state may be one where the CP-VTOD provides a darkened state having a PT % corresponding to a Munsell value of 5 or less and that darkened state has a chromaticity falling within chroma 2 of that Munsell value. For example, referring again to FIG. 2B, a low chromaticity state may be one where the CP-VTOD has a darkened state with a PT % of 19.8% (or less) that falls within neutral region 202, or alternatively a PT % of 12.0% (or less) and falls within neutral region 212, or alternatively a PT % of 6.6% (or less) and falls within neutral region 222, or alternatively a PT % of 3.1% (or less) and falls within neutral region 232, or alternatively a PT % of 1.2% (or less) and falls within neutral region 242. Note that these are just representative regions and one of ordinary skill can readily construct other neutral regions other PT %/Munsell values.

Color Fidelity

Another way to evaluate the effect of a CP-VTOD on color is by "color rendering" methodologies for which standardized methods have been developed to qualify the ability of various white light sources to produce an acceptable level of color distortion of a scene. As mentioned, the appearance of colors viewed through a CP-VTOD can be treated by the same techniques which would be used if surface colors were examined under lights of various colors. A useful color rendering method is described in ANSI/IES TM-30-20 (incorporated herein by reference for all purposes) for evaluating light source color rendition. Further information about the use of this standard can be found in "Analysis of Color Rendition Specification Criteria" by Michael P. Royer, Proc. SPIE 10940, Light-Emitting Devices, Materials, and Applications, 109401J (1 Mar. 2019) doi: 10.1117/12.2507283, and also in "Tutorial: Background and Guidance for Using the ANSI/IES TM-30 Method for Evaluating Light Source Color Rendition" by Michael Royer, March 2021, LEUKOS The Journal of the Illuminating Engineering Society of North America 18(5): 1-41, DOI:10.1080/15502724.2020.1860771, both of which are incorporated herein by reference for all purposes.

These references describe the use of a color fidelity index $R_f$ when analyzing light sources. That is, light or a scene transmitted through a CP-VTOD can be characterized by its $R_f$. $R_f$ has been found in some cases to be a metric superior to the more common color rendering index, $R_a$. Another metric often associated or used with $R_f$ is a "gamut index" $R_g$. There is no single interpretation of what is considered good or bad color fidelity, but Royer (in "Analysis of Color Rendition Specification Criteria" cited above) proposed the following guidelines (referred to herein as "Royer's proposed guidelines"): Tier C "acceptable" when $R_f$ is at least 70 and $R_g$ is at least 89; Tier B "good" when $R_f$ is at least 74 and $R_g$ is at least 92; and Tier A "best" when $R_f$ is at least 78 and $R_g$ is at least 95. In some embodiments, CP-VTODs of the present disclosure may have a clear state characterized by an $R_{f\text{-}CS}$ of at least 90, a first darkened state characterized by an $R_{f\text{-}D1}$ of at least 85, and a second darkened state characterized by an $R_{f\text{-}D2}$ of at least 70.

MC-VTOD Embodiments and Properties

FIGS. 3A-3E are a series of cross-sectional schematics of a non-limiting example of a CP-VTOD according to some embodiments. CP-VTOD 310 includes a first cell 311 having a first guest-host mixture including a negative first CLC host 322 and a first dyestuff material that includes at least one positive first DC dye 324 or a dye mixture. The host and dye molecules are drawn to illustrate a general orientation. The first cell is in optical communication with a second cell having a second guest-host mixture including a negative second CLC host 342 and a second dyestuff material that includes at least one positive second DC dye 344 or dye mixture that is different than the first DC dye 324. For clarity, other components of cells 311, 331 are not shown, but may optionally be as described with respect to FIG. 1 and variations thereof. Each cell can be independently controlled by power circuits $V_1$ and $V_2$ provided in controller 355.

In this embodiment, the first cell absorbs light in a first wavelength region and the second cell absorbs light in a second wavelength region that is different from the first wavelength region. In particular, the dyes of each cell are chosen so that, in combination, the cells may be capable of producing a darkened state that has low color chromaticity or is colorimetrically neutral (i.e., the second wavelength region is complementary to the first wavelength region). For example, one cell may appear blue in its reduced light transmissive state, i.e., it has substantial transmission or a transmission peak in the blue wavelength range, e.g., in a range of about 430 nm to about 490 nm, relative to other visible light wavelengths. The other cell may appear yellow or orange in its reduced light transmissive state, i.e., it has substantial transmission or a transmission peak in the yellow or orange wavelength range, e.g., in a range of about 570 nm to about 630 nm, relative other visible light wavelengths. Appropriate mixing of the colors from the two cells can produce a low color chromaticity or colorimetrically neutral darkened state. In some embodiments, at least one cell uses a mixture of 2 or more dyes in order to absorb across a sufficient range of wavelengths, e.g., a cell that appears blue may include a dye that absorbs green and another dye that absorbs red. In some embodiments, both cells include a mixture of dyes.

Figure 3A:
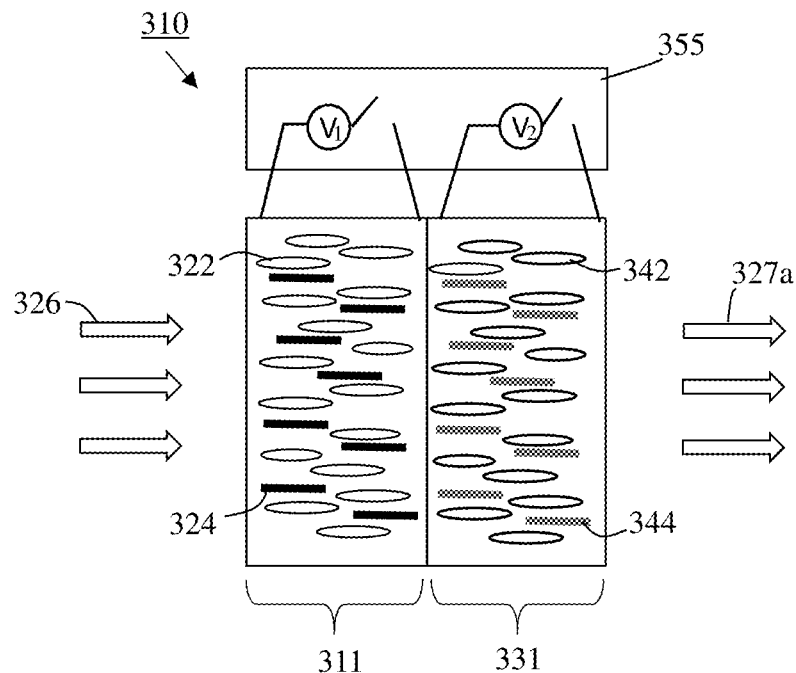
FIGS. 3A-3E are series of cross-sectional schematics of a non-limiting example of a CP-VTOD according to some embodiments.

In FIG. 3A, both power circuits $V_1$ and $V_2$ are open with no voltage applied across either cell 311, 331. The first and second cells are both in a state of higher light transmission (which may be at or near their maximum light transmission state) and the CP-VTOD 310 is in a clear state which may be at or near its most light transmissive state where a substantial amount of incident visible light 326 passes through as transmitted light 327a. In some embodiments, the transmitted light 327a is colorimetrically neutral or has a low color chromaticity. In some cases, transmitted light 327a may have a chromaticity $C_{CS}$ that is within region 202 or quadrangle 204 of FIG. 2A and/or has a chromaticity $C_{CS}$ that is not significantly altered after passing through the clear state CP-VTOD (e.g., in CIE 1931 x-y space, the chromaticity $C_{CS}$ of clear state transmitted light 327a stays within 0.07 units (x and y) of the chromaticity of the incident visible light 326, alternatively within 0.06 units, 0.05 units or 0.04 units. The clear state may have an average % $T_{CS}$ of at least 20% as measured across at least 400-700 nm (alternatively across 380 nm-780 nm) and/or the clear state may have a photopic transmission $PT_{CS}$ of at least 20% (alternatively, at least 30%, 40%, 50%, 60%, 70%, 80%, 90%, or 95% for % $T_{CS}$ or $PT_{CS}$). In some embodiments, the clear state may provide a color fidelity index $R_{f\text{-}CS}$ of at least 90 (alternatively, at least 92, 95, or 97), and optionally a gamut index $R_{g\text{-}CS}$ of at least 90 (alternatively, at least 92, 95, or 97).

Figure 3B:
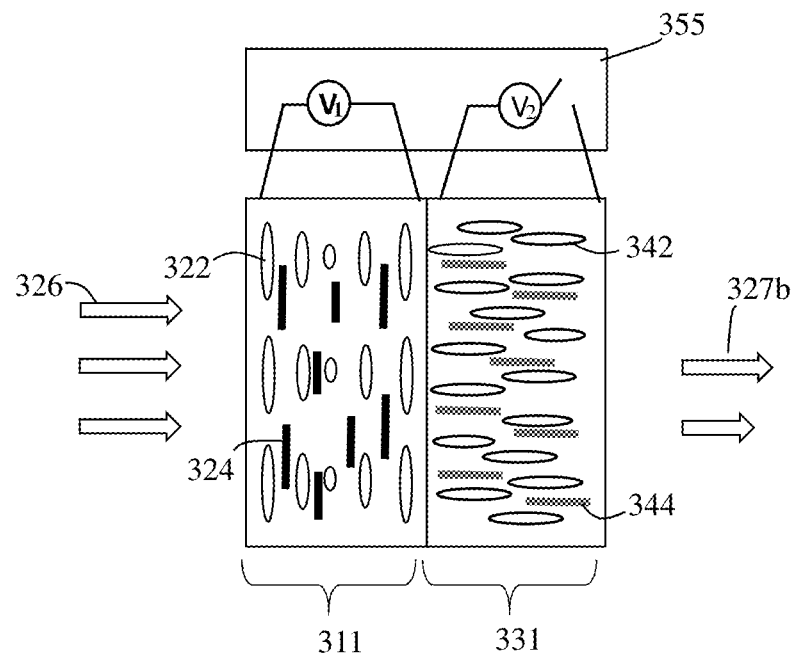

In FIG. 3B, the second cell's power circuit $V_2$ remains open with no voltage applied, but the first cell's power circuit $V_1$ is closed, and a voltage is applied above a threshold voltage sufficient to significantly reorient the CLC host 322 and DC dye 324. Light absorption in a first wavelength region increases as the voltage is increased. Light transmission can be varied based on applied voltage up to a point, beyond which, increasing the voltage has less effect. In FIG. 3B, the CP-VTOD is in a first tinted state where the first cell 311 is in a state of lower light transmittance (optionally at or near its minimal light transmission state) in a first wavelength region such that some amount of incident visible light 326 in the first wavelength region is absorbed resulting in transmitted light 327b having a first color or tint. In this mode, the CP-VTOD is not operating to preserve color, but deliberately filtering light to produce the first color or tint, which can be beneficial or desirable to a user for various reasons.

Figure 3C:
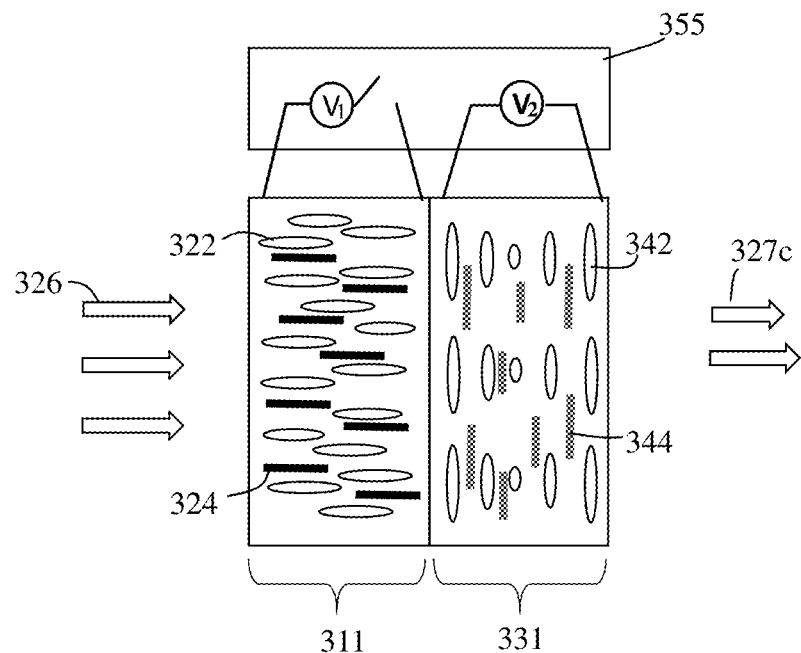

In FIG. 3C, the first cell's power circuit $V_1$ is open with no voltage applied, but the second cell's power circuit $V_2$ is closed, and a voltage is applied above a threshold voltage sufficient to significantly reorient the CLC host 342 and DC dye 344. Light absorption in a second wavelength region increases as the voltage is increased. Light transmission can be varied based on applied voltage up to a point, beyond which, increasing the voltage has less effect. In FIG. 3C, the CP-VTOD is in a second tinted state where the second cell is in a state of lower light transmittance (optionally at or near its minimal light transmission state) in a second wavelength region such that some amount of incident visible light 326 in the second wavelength region is absorbed resulting in transmitted light 327c having a second color or tint. In this mode, as in FIG. 3B, the CP-VTOD is not operating to preserve color, but deliberately filtering light to produce the second color or tint, which can be beneficial or desirable to a user for various reasons. The first tinted state may represent a first color state and the second tinted state may represent a second color state wherein the second color may be complementary to the first color.

Figure 3D:
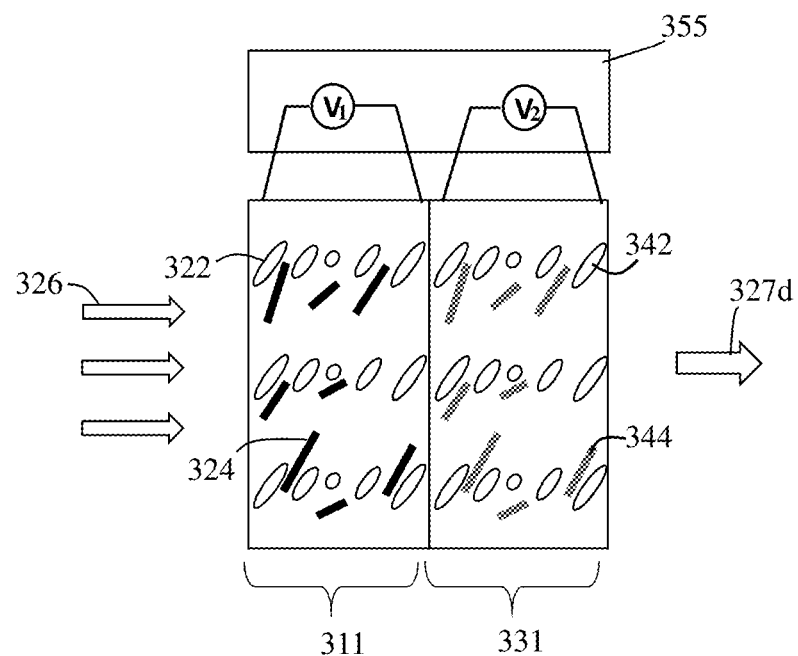

In FIG. 3D, both the first and second cell's power circuits $V_1$ and $V_2$ are closed as described in FIGS. 3B and 3C, respectively, but the applied voltages are lower, so that the reorientation of the CLC hosts and dyes is in an intermediate state. In some cases, $V_1$ and $V_2$ may be commonly controlled. In FIG. 3D, the CP-VTOD 310 is in a colorimetrically neutral (or low color chromaticity) first darkened state. The first darkened state may have an average % $T_{D1}$ measured across 400-700 nm (alternatively across 380-780 nm) that is lower than the average % $T_{CS}$ of the clear state and/or a photopic transmission $PT_{D1}$ that is lower than the photopic transmission of the clear state $PT_{CS}$. In some cases, these values (% $T_{D1}$ or $PT_{D1}$) may be at least 5% lower, alternatively at least 10%, 15%, 20%, 25%, 30%, 35%, or 40% lower. Note that "5% lower" refers to the transmission (% T) units and a simple subtraction operation, e.g., PT % @ clear state–PT % @ first darkened state≥5%. In some cases, $PT_{D1}$ is less than or equal to $0.8*PT_{CS}$, alternatively less than or equal to $0.7*PT_{CS}$, $0.6*PT_{CS}$, $0.5*PT_{CS}$, $0.4*PT_{CS}$, $0.3*PT_{CS}$, $0.2*PT_{CS}$, or $0.1*PT_{CS}$, CP-VTOD 310 is not at or near its minimal light transmissive state, so that an intermediate amount of incident visible light 326 is absorbed resulting in a moderate amount of transmitted light 327d that is colorimetrically neutral or has low color chromaticity. Transmitted light 327d of the first darkened state may have a chromaticity $C_{D1}$ that is within region 202 or quadrangle 204 of FIG. 2A and/or has a chromaticity $C_{D1}$ that is not significantly different from the clear state chromaticity $C_{CS}$, e.g., in CIE 1931 x-y space, the chromaticity $C_{D1}$ of first darkened state transmitted light 327d is within 0.07 units (x and y) of the chromaticity of the clear state chromaticity $C_{CS}$, alternatively within 0.06 units, 0.05 units or 0.04 units. In some embodiments, the first darkened state may provide a color fidelity index $R_{f\text{-}D1}$ of at least 85 (alternatively, at least 90, 95, or 97), and optionally a gamut index $R_{g\text{-}D1}$ of at least 90 (alternatively, at least 92, 95, or 97). In some cases, $PT_{D1}$ can be characterized by a Munsell value $MV_{D1}$, and $C_{D1}$ falls within chroma 2 when $MV_{D1}$ is 5 or less.

Figure 3E:
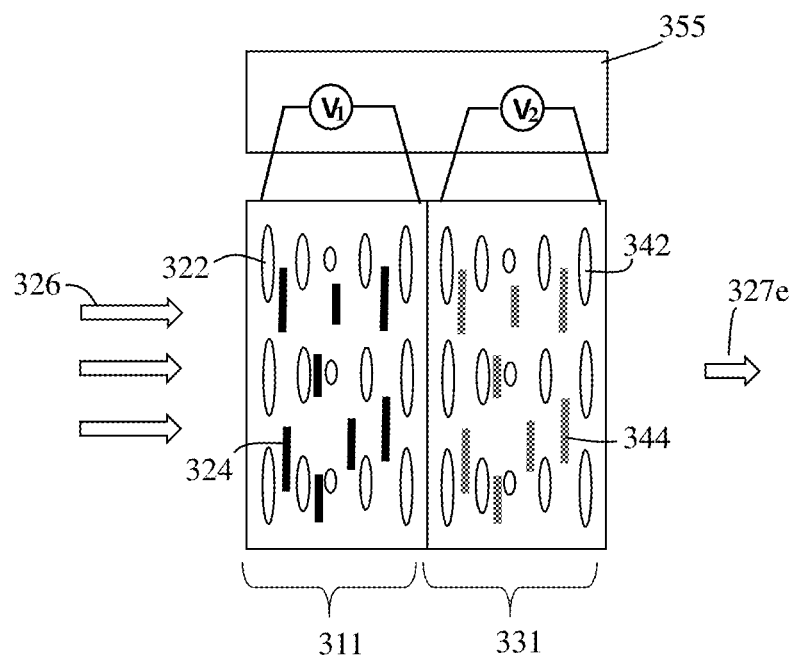

Referring to FIG. 3E, the voltages across each cell of CP-VTOD 310 have been increased to produce a colorimetrically neutral (or low color chromaticity) second darkened state. The second darkened state may have an average % $T_{D2}$ measured across 400-700 nm (alternatively, across 380 nm-780 nm) that is lower than the average % $T_{D1}$ of the first darkened state and/or a photopic transmission $PT_{D2}$ that is lower than the photopic transmission of the first darkened state $PT_{D1}$. In some cases, these values (% $T_{D2}$ or $PT_{D2}$) may be at least 5% lower, alternatively at least 10%, 15%, 20%, 25%, 30%, 35%, or 40% lower. In some cases, $PT_{D2}$ is less than or equal to $0.8*PT_{D1}$, alternatively less than or equal to $0.7*PT_{D1}$, $0.6*PT_{D1}$, $0.5*PT_{D1}$, $0.4*PT_{D1}$, $0.3*PT_{D1}$, $0.2*PT_{D1}$, or $0.1*PT_{D1}$, CP-VTOD 310 may optionally be at or near its minimal light transmissive state, i.e., the second darkened state may correspond to its darkest state. Alternatively, the second darkened state may, while darker than the first darkened state, not be at its darkest state. Transmitted light 327e of the second darkened state may have a chromaticity $C_{D2}$ that is within region 202 or quadrangle 204 of FIG. 2A and/or has a chromaticity $C_{D2}$ that is not significantly different from the clear state chromaticity $C_{D1}$, e.g., in CIE 1931 x-y space, the chromaticity $C_{D2}$ of the second darkened state transmitted light 327e is within 0.07 units (x and y) of the chromaticity of the first darkened state $C_{D1}$, alternatively within 0.06 units, 0.05 units or 0.04 units. In some embodiments, the second darkened state may provide a color fidelity index $R_{f\text{-}D1}$ of at least 70 (alternatively, at least 75, 80, 85, 90, 95, or 97), and optionally a gamut index $R_{g\text{-}D1}$ of at least 90 (alternatively, at least 92, 95, or 97). In some cases, $PT_{D2}$ can be characterized by a Munsell value $MV_{D2}$, and $C_{D2}$ falls within chroma 2 when $MV_{D2}$ is 5 or less.

Other sets of complementary colors may be used. One cell may appear green in its reduced light transmissive state, i.e., having substantial or a peak light transmission in a green wavelength range of about 500 nm to about 565 nm relative to other colors, and another cell may appear magenta or purple having substantial or a peak light transmission in both the blue wavelength range (e.g., 430 nm to about 490 nm) and in the red wavelength range (e.g., about 600 nm to about 700 nm) relative to the green wavelength range. Similarly, one cell may appear red in its reduced light transmissive state, i.e., having substantial or peak light transmission in a range of about 600 nm to about 700 nm relative to other colors, and another cell may appear cyan having substantial light transmission in both the blue and green wavelength ranges and may optionally have a peak transmission in a range of about 490 nm to about 510 nm.

In some embodiments, rather than two cells, three cells may be used, e.g., one that absorbs red light, one that absorbs green light, and one that absorbs blue light. In combination, a colorimetrically neutral or low color chromaticity darkened state can be generated. Such a device could further extend the color palette options when using CP-VTOD thereby increasing its overall versatility.

FIGS. 4A-4D are a series of cross-sectional schematics of a non-liming example of a CP-VTOD according to some embodiments. In this embodiment, both cells are formulated to provide wide band absorbance. CP-VTOD 410 includes a first cell 411 having a first guest-host mixture including a negative first CLC host 422 and a first dyestuff material that includes a positive first DC dye mixture 424. The host and dye molecules are drawn to illustrate a general orientation. The first cell is in optical communication with a second cell having a second guest-host mixture including a negative second CLC host 442 and a second dyestuff material that includes a positive second DC dye mixture 444 or dye mixture. The hosts and dye mixtures of the first and second cells may be the same or different. For clarity, other components of cells 411, 431 are not shown, but may optionally be as described with respect to FIG. 1 and variations thereof. In some embodiments, each cell can be independently controlled by power circuits $V_1$ and $V_2$ provided in controller 455. In other embodiments (not shown), the application of a voltage across the first and second cells may be commonly controlled.

In this embodiment, the first and second wide band cells both absorb light across the visible region of 400-700 nm, or alternatively 380-780 nm. In some preferred embodiments, the first and second cells absorb light in first and second wavelength regions, respectively, and the second wavelength region is substantially the same as the first wavelength region. Wavelength regions that are substantially the same between cells may be those that, when darkened to the same photopic transmission (e.g., to a PT % in a range of 20-40%), have spectra characterized by a % T for each wavelength that is within 10% units of each other, alternatively within 5% units, within a wavelength range of at least 450-650 nm, alternatively 400-700 nm, alternatively 380-780 nm. In some embodiments, wavelength regions that are substantially the same may produce CIE 1931 x-y chromaticities in clear and darkened states for each cell that are within region 202 or quadrangle 204 of FIG. 2A. The photopic transmission of each cell in a darkened state may be characterized by a Munsell value. In some embodiments, wavelength regions that are substantially the same may produce chromaticities that fall within chroma 2 when the corresponding Munsell value for each cell is 5 or less. In some embodiments, the host and dye mixtures selected for the first cell and second cell are substantially the same, i.e., having the same chemical structures and concentrations that are the same within about 10%.

Figure 4A:
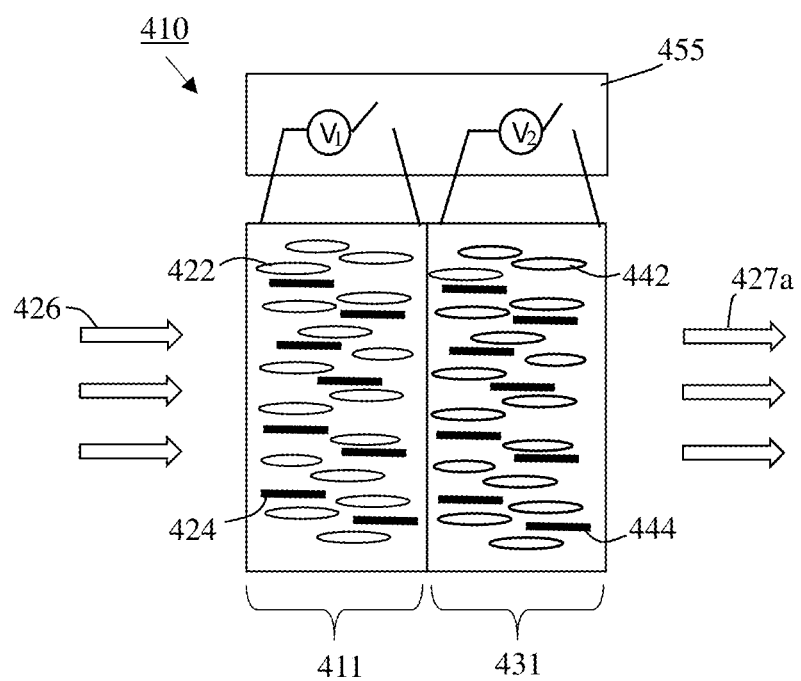
FIGS. 4A-4D are a series of cross-sectional schematics of a non-liming example of another CP-VTOD according to some embodiments.

In FIG. 4A, both power circuits $V_1$ and $V_2$ are open with no voltage applied across either cell 411, 431. The first and second cells are both in a state of higher light transmission (which may be at or near their maximum light transmission state) and the CP-VTOD 410 is in a clear state which may be at or near its most light transmissive state where a substantial amount of incident visible light 426 passes through as transmitted light 427a. In some embodiments, the transmitted light 427a is colorimetrically neutral or has low color chromaticity. In some cases, transmitted light 427a may have a chromaticity $C_{CS}$ that is within region 202 or quadrangle 204 of FIG. 2A and/or has a chromaticity $C_{CS}$ that is not significantly altered after passing through the clear state CP-VTOD (e.g., in CIE 1931 x-y space, the chromaticity $C_{CS}$ of clear state transmitted light 427a stays within 0.07 units (x and y) of the chromaticity of the incident visible light 426, alternatively within 0.06 units, 0.05 units or 0.04 units. The clear state may have an average % $T_{CS}$ of at least 20% as measured across at least 400-700 nm (alternatively across 380 nm-780 nm) and/or the clear state may have a photopic transmission $PT_{CS}$ of at least 20% (alternatively, at least 30%, 40%, 50%, 60%, 70%, 80%, 90%, or 95% for % $T_{CS}$ or $PT_{CS}$). In some embodiments, the clear state may provide a color fidelity index $R_{f-CS}$ of at least 90 (alternatively, at least 92, 95, or 97), and optionally a gamut index $R_{g-CS}$ of at least 90 (alternatively, at least 92, 95, or 97).

Figure 4B:
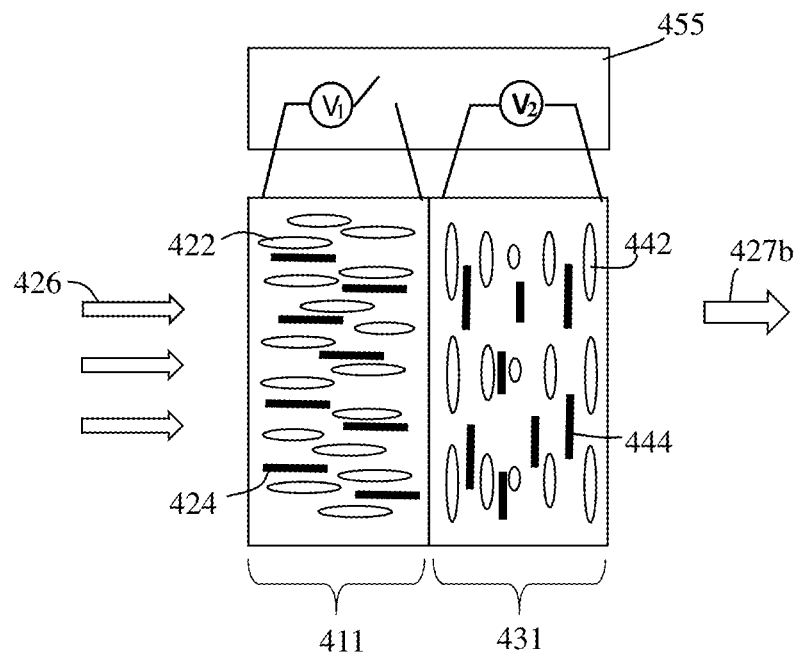
Figure 4C:
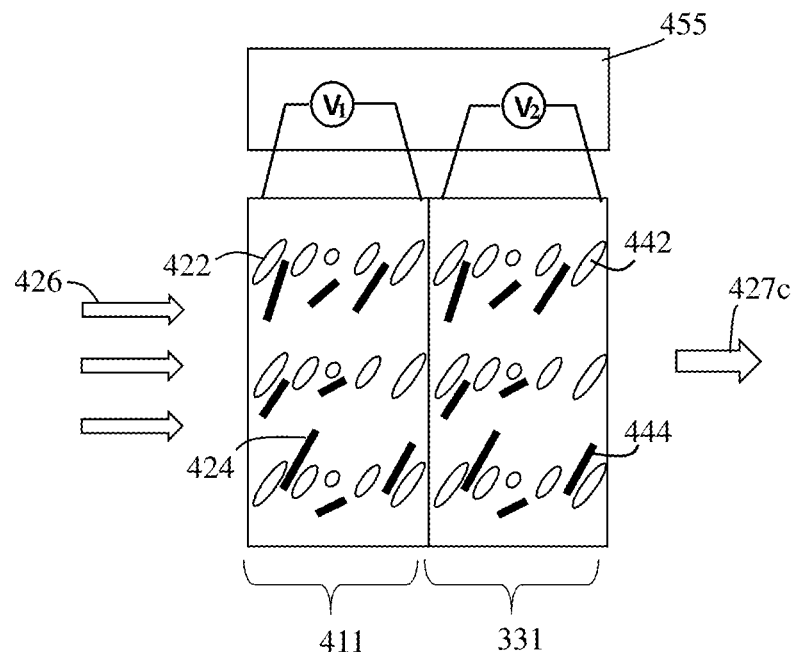

FIGS. 4B and 4C illustrate two different ways that CP-VTOD 410 may be set to a colorimetrically neutral or low color chromaticity first darkened state. In FIG. 4B, the first cell's power circuit $V_1$ is open with no voltage applied, but the second cell's power circuit $V_2$ is closed, and a voltage is applied above a threshold voltage sufficient to significantly reorient the CLC host 442 and DC dye mixture 444. In FIG. 4C, both the first and second cell's power circuits $V_1$ and $V_2$ are closed, but the applied voltages are selected so that the reorientation of the CLC hosts and dyes is in an intermediate state. The intensity of transmitted light 427b and 427c of the first darkened state may be the same. Regardless of how the first darkened state is produced, it may have an average % $T_{D1}$ measured across 400-700 nm (alternatively, across 380-780 nm) that is lower than the average % $T_{CS}$ of the clear state and/or a photopic transmission $PT_{D1}$ that is lower than the photopic transmission of the clear state $PT_{CS}$. In some cases, these values (% $T_{D1}$ or $PT_{D1}$) may be at least 5% lower, alternatively at least 10%, 15%, 20%, 25%, 30%, 35%, or 40% lower. In some cases, $PT_{D1}$ is less than or equal to $0.8*PT_{CS}$, alternatively less than or equal to $0.7*PT_{CS}$, $0.6*PT_{CS}$, $0.5*PT_{CS}$, $0.4*PT_{CS}$, $0.3*PT_{CS}$, $0.2*PT_{CS}$, or $0.1*PT_{CS}$. CP-VTOD 410 is not at or near its minimal light transmissive state and an intermediate amount of incident visible light 426 is absorbed resulting in a moderate amount of transmitted light 427b, 427c that is colorimetrically neutral or has low color chromaticity. Transmitted light of the first darkened state may have a chromaticity $C_{D1}$ that is within region 202 or quadrangle 204 of FIG. 2A and/or has a chromaticity $C_{D1}$ that is not significantly different from the clear state chromaticity $C_{CS}$, e.g., in CIE 1931 x-y space, the chromaticity $C_{D1}$ of first darkened state transmitted light is within 0.07 units (x and y) of the chromaticity of the clear state chromaticity $C_{CS}$, alternatively within 0.06 units, 0.05 units or 0.04 units. In some embodiments, the first darkened state may provide a color fidelity index $R_{f\text{-}D1}$ of at least 85 (alternatively, at least 90, 95, or 97), and optionally a gamut index $R_{g\text{-}D1}$ of at least 90 (alternatively, at least 92, 95, or 97). In some cases, $PT_{D1}$ can be characterized by a Munsell value $MV_{D1}$, and $C_{D1}$ falls within chroma 2 when $MV_{D1}$ is 5 or less.

Figure 4D:
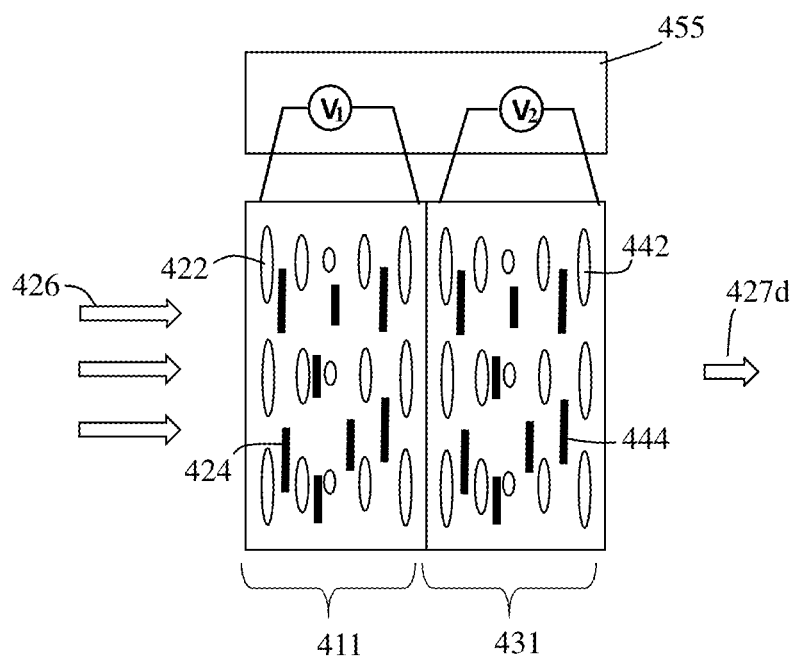

Referring to FIG. 4D, the voltages across each cell of CP-VTOD 310 have been set to produce a colorimetrically neutral or low color chromaticity second darkened state. The second darkened state may have an average % $T_{D2}$ measured across 400-700 nm (alternatively, across 380-780 nm) that is lower than the average % $T_{D1}$ of the first darkened state and/or a photopic transmission $PT_{D2}$ that is lower than the photopic transmission of the first darkened state $PT_{D1}$. In some cases, these values (% $T_{D2}$ or $PT_{D2}$) may be at least 5% lower, alternatively at least 10%, 15%, 20%, 25%, 30%, 35%, or 40% lower. In some cases, $PT_{D2}$ is less than or equal to $0.8*PT_{D1}$, alternatively less than or equal to $0.7*PT_{D1}$, $0.6*PT_{D1}$, $0.5*PT_{D1}$, $0.4*PT_{D1}$, $0.3*PT_{D1}$, $0.2*PT_{D1}$, or $0.1*PT_{D1}$. CP-VTOD 410 may optionally be at or near its minimal light transmissive state, i.e., the second darkened state may correspond to its darkest state. Alternatively, the second darkened state may, while darker than the first darkened state, not be at its darkest state. Transmitted light 427d of the second darkened state may have a chromaticity $C_{D2}$ that is within region 202 or quadrangle 204 of FIG. 2A and/or has a chromaticity $C_{D2}$ that is not significantly different from the first darkened state chromaticity $C_{D1}$, e.g., in CIE 1931 x-y space, the chromaticity $C_{D2}$ of the second darkened state transmitted light is within 0.07 units (x and y) of the chromaticity of the first darkened state $C_{D1}$, alternatively within 0.06 units, 0.05 units or 0.04 units. In some embodiments, the second darkened state may provide color fidelity index $R_{f\text{-}D1}$ of at least 70 (alternatively, at least 75, 80, 85, 90, 95, or 97), and optionally a gamut index $R_{g\text{-}D1}$ of at least 90 (alternatively, at least 92, 95, or 97). In some cases, $PT_{D2}$ can be characterized by a Munsell value $MV_{D2}$, and $C_{D2}$ falls within chroma 2 when $MV_{D2}$ is 5 or less.

In some cases, dyes of a dye mixture, while having a different light absorption profile, may have similar electro-optic properties. For example, a dichroic dye a within a dye mixture may have a dye order parameter ($S_{dye}$) that is within 30% of any other dichroic dye of the mixture, alternatively within 25%, 20%, 15%, 10%, 8%, 5%, or 3%. In some cases, a dichroic dye within a dye mixture may have a dichroic ratio ($DR_{dye}$) that is within 30% of any other dichroic dye of the mixture, alternatively within 25%, 20%, 15%, 10%, 8%, 5%, or 3%. In order to preserve the color of transmitted light (clear, first darkened state, second darkened state), differently colored dyes should respond to an electric field in a similar way. If a first dye has a dye order parameter or dichroic ratio that is substantially higher than a second, differently colored dye, application of an electric field may cause the first dye to absorb relatively more light in its absorption region as compared to the second dye, resulting in a chromaticity shift, e.g., between the first and second darkened states. The aforementioned ranges for dye order parameter and dichroic ratio may not apply to dyes provided in low amounts. That is "any other dichroic dye" may refer only to such dyes contributing more than about 30% of light absorption at a particular wavelength.

In some embodiments, all dichroic dyes of the first and second cells may have similar dye order parameters and/or dichroic ratios as described above for a mixture, in particular when the electric fields applied across the first and second cells are commonly controlled. Note that "all dichroic dyes" in this context may refer to only such dyes contributing more than about 30% of light absorption at a particular wavelength.

Although the CP-VTOD has been characterized above in terms of a clear state, a first darkened state, and a second darkened state, there is no particular limit on the number of darkened states. The CP-VTOD may be capable of at least 2 darkened states, but may be capable of at least 3, 4, 5, 6, 10, or even more darkened states of various PT % values or average % T values (e.g., measured across 400-700 nm, or alternatively 380-780 nm). In some cases, the CP-VTOD may include a darkest state that is darker than the second darkened state. That is, the darkest state may have a photopic transmission $PT_{DS}$ that is lower than $PT_{D2}$. Such a darkest state may in some cases have a chromaticity $C_{DS}$ that is colorimetrically neutral or has low color chromaticity, e.g., within region 202 or quadrangle 204 of FIG. 2A. In some cases, $PT_{DS}$ can be characterized by a Munsell value $MV_{DS}$, and $C_{DS}$ falls within chroma 2 when $MV_{DS}$ is 5 or less.

As mentioned with respect to FIGS. 3A-3E, the CP-VTOD may benefit from an ability to not only preserve chromaticity between clear and various darkened states, but be able to produce a tint or color. For example, military personnel, police, or pilots may wear CP-VTOD goggles or visors and may encounter hostile laser light. Although preserving color is important as the VTOD is adjusted for changes in ambient light, it can also be very important to filter out laser light. In some embodiments, a third cell may be added that includes a narrow band mixture (a narrow band cell) and which can be independently controlled relative to the first and second cells. A system like this may be useful for defending against lasers where the third (narrow band) cell may be designed to absorb light from one or more lasers but where general darkening is controlled by the first and second cells.

Figure 5:
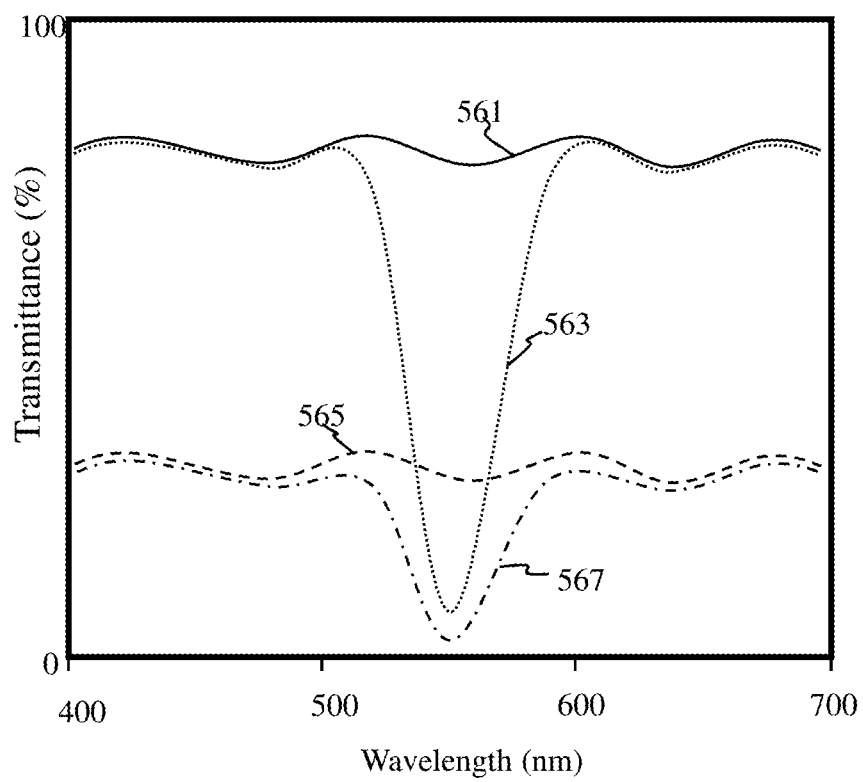
FIG. 5 is a graph of various light transmittance spectra illustrating the effect of adding a narrow band cell to the CP-VTOD according to some embodiments.

To further illustrate how wide band and narrow band cells may be used together, FIG. 5 shows a set of light transmittance spectra according to some embodiments. Transmittance spectrum 561 corresponds to the clear state of an CP-VTOD where both the first and second cells are in their state of higher transmittance. Transmittance spectrum 561 may be colorimetrically neutral or have low color chromaticity. Transmittance spectrum 563 corresponds to a first tinted state where a third cell having a narrow band mixture is in a state of lower transmittance, and the first and second cells, remains in a clear state. This first tinted state may, for example, be used to absorb green laser light. Transmittance spectrum 565 corresponds to a darkened state produced by the first and second cells as previously described. The darkened state could be a colorimetrically neutral (or low color chromaticity) first or second darkened state or even a colorimetrically neutral (or low color chromaticity) darkest state. Transmittance spectrum 567 corresponds to a dark tinted state where the third cell and one or both of the first or second cells are in a state of lower transmittance. The dark tinted state may be used to protect against laser light while also providing the user with reduced overall light transmittance. Although transmittance spectrum 567 has the lowest overall transmittance of the spectrums, it may not represent a colorimetrically neutral or low color chromaticity darkest state. If the overall average % T of spectrum 567 is high enough, transmitted light of the second tinted state may be perceived as having a magenta hue. If the overall average % T of spectrum 567 is low enough (corresponding to a low Munsell value) it may be difficult to perceive a hue and may instead be characterized as having a low color chromaticity.

In some embodiments, a CP-VTOD may include or be interfaced with an additional variable transmission optical device. For example, the MC-VTOD may include an additional cell that is a wide band VTOD, a narrow band VTOD, photochromic device, or a hybrid VTOD that may include PC dyes and/or PCDC dyes.

In some embodiments, one cell of the MC-VTOD may include a CLC host having right-handed chirality and the other cell of the MC-VTOD may include a CLC host having left-handed chirality. In some embodiments, the light absorbance curves of the two cells may have significant overlap. By changing the handedness of the CLC, the polarization dependence in the overlap region (although generally small in the present guest-host systems) may be further reduced which can result in a beneficial transmission swing increase. This effect may be strongest where the overlap is in the green region of the visible spectrum where the human eye has highest sensitivity, e.g., in first/second cell combinations of blue/yellow-orange and red/cyan.

The chirality of the host material results in an intrinsic pitch, p, of the liquid crystal host material. The ratio of the cell gap thickness, d, to this pitch is referred to as d/p. In some embodiments, the liquid crystal host may have d/p equal to 0. In some embodiments, the liquid crystal host may have a d/p greater than 0. In some embodiments having low d/p and birefringence, referred to as "In the Mauguin limit", the polarization of the light follows that of the liquid crystal. Alternatively, devices that are not In the Mauguin limit, light propagation eigenmode are elliptical. In some cases, the host liquid crystal may make the device less polarization sensitive, i.e., less than 90%, 80%, 70%, 60%, 50%, 40%, 30%, 20% or 10% polarization sensitive.

In some embodiments, the cells of the CP-VTOD may have a thickness to pitch ratio (d/p) of at least 0.01, alternatively at least 0.1, 0.2, 0.3, 0.4, or 0.5. In some embodiments, d/p is less than or equal to 3.0, or alternatively less than or equal to 2 or 1. In some embodiments, d/p may be in a range of 0.01-0.2, 0.2-0.3, 0.3-0.4, 0.4-0.5, 0.5-0.6, 0.6-0.7, 0.7-0.8, 0.8-0.9, 0.9-1.0, 1.0-1.5, 1.5-2.0, 2.0-2.5, 2.5-3.0, or any combination of ranges thereof.

In some embodiments, the CP-VTOD may use plastic substrates that have an optical retardation with less than ±20% variation in uniformity across the area of the device, alternatively less than ±15%, or less than ±10%.

In some embodiments, the cells of the CP-VTOD may have a cell gap in a range of 3 to 5 microns, 5 to 7 microns, 7 to 10 microns, 10 to 15 microns, or 15 to 20 microns, or any combination of ranges thereof.

In some embodiments, the MC-VTOD or variable transmission optical system may have a transmission swing (the difference between the most transmissive "clear" state and the least transmissive "darkest" low chromaticity state) that is greater than or equal to 20%, alternatively greater than 25%, 30%, 35%, 40%, 45%, 50%, 55%, 60%, 65%, 70%, 75%, or 80%. The darkest state may correspond to the least transmissive colorimetrically neutral or low color chromaticity darkened state.

When an CP-VTOD is also intended to guard against laser light, in some cases, the transmission at the laser wavelength may be equal to or less than 15%, alternatively equal to or less than 10%, 5%, 1%, or 0.5%. Some non-limiting examples of such laser wavelengths include one or more of 405 nm, 450 nm, 473 nm, 488 nm, 532 nm, 515 nm, 520 nm, 589 nm, 593 nm, 638 nm, 650 nm, and 670 nm.

In some embodiments, the guest-host mixture has a nematic-isotropic transition temperature TNI greater than 40° C.

In other embodiments, the TNI is greater than 45° C., 50° C., 55° C., 60° C., 65° C., 70° C., 75° C., 80° C., 85° C. or 90° C.

In one example, the effective order parameter of guest host mixture containing one or more dichroic dyes exhibiting a wide absorbance spectrum (e.g. a neutral dye) is calculated as $S_{eff}=(D_{eff}-1)(D_{eff}+2)$, where $D_{eff}=\int A_\parallel(\lambda)d\lambda / \int A_\perp(\lambda)d\lambda$ is the "effective dichroic ratio" and $A_\parallel(\lambda)$ and $A_\perp(\lambda)$ are the parallel and perpendicular absorbance of the dye at wavelength $\lambda$. Typically, $\int A_\parallel(\lambda)d\lambda$ and $\int A_\perp(\lambda)d\lambda$, are evaluated over an appropriate region of the spectrum. If the absorption spectrum has a single peak, the integrals are simple to evaluate, the integration limits being the wavelengths of the endpoints of the FWHM of the spectrum. If there is more than one distinct peak in the absorption spectrum, the integrals are evaluated in a piece-wise fashion, the integration limits being the wavelengths of the endpoints of the FWHM of each peak. This piece-wise integration produces what the Applicant calls an "aggregate dichroic ratio" $D_{eff-agg}$ and an "aggregate effective order parameter" $S_{eff-agg}$.

The order parameter of the mixture can be determined by optical measurements of the light transmission in the resting and energized states using linearly and/or circularly polarized lights at several wavelengths both within and outside of the absorption spectrum. Then, using liquid crystal optics simulation methods such as those developed by Berreman, (Berreman D. W. 1972, Optics in Stratified and Anisotropic Media: 4×4-Matrix Formulation. Journal of the Optical Society of America, 62(4), 502). or Odano (Allia, P., Oldano, G., & Trossi, L., 1986, 4×4 Matrix approach to chiral liquid-crystal optics. Journal of the Optical Society of America B, 3(3), 424); the order parameter can be determined by numerical fitting to the experimental data. These simulation methods are used by those skilled in the art or through commercial programs such as Twisted Cell Optics by Kelly (Kelly, J., Jamal, S., & Cui, M., 1999, Simulation of the dynamics of twisted nematic devices including flow. Journal of Applied Physics, 86(8), 4091).

In some embodiments, the one or more cells of the CP-VTOD includes a guest-host mixture with an order parameter, $S_{mix}$, greater than or equal to 0.65, 0.7, 0.71, 0.72, 0.73, 0.74, 0.75, 0.76, 0.77 or 0.78, alternatively greater than or equal to 0.79 or 0.80.

Applications

The CP-VTOD has a wide variety of potential uses. For example, these devices may be directly fabricated into or laminated onto "wearable" products such as eyewear (such as prescription and non-prescription glasses and sunglasses), visors, goggles, face shields, near-eye displays, sensor optics, cameras, and AR/VR headsets to name a few. Alternatively, they may be directly fabricated into or laminated onto other products including, but not limited to, windows (vehicles, buildings, aircrafts, etc.), windshields, sunroofs, heads-up displays, camera filters, and optical instruments. Such products and devices may be further equipped with power supplies, batteries, sensors or the like. In some embodiments, the sensor(s) can provide information or data that is used in the operation of the CP-VTOD. Some non-limiting examples of sensors include a light sensor, an imaging sensor, and a laser warning receiver.

In some embodiments, one or both cells of the CP-VTOD may be divided into discrete, individually addressable regions to allow different regions of the CP-VTOD to display different states. In some cases, such regions may be formed by patterning the transparent conducting layer, optionally in combination with dividers to separate the electro-optic material into different sub-cells within the cell.

Example Embodiments

A CP-VTOD may be fabricated according to protocols similar to that described here. Each cell can be fabricated using isotropic substrates of 3 mil polycarbonate coated with Indium Thin Oxide (ITO), a transparent conductor. On top of the ITO, a coating of polyimide, e.g., Nissan 5661 (Nissan Chemical Industries, Ltd., Tokyo, Japan), may be applied. This polyimide coating can serve as an alignment layer designed to induce a strong homeotropic alignment of the liquid crystal molecules. Plastic spheres, e.g., 6.2 microns may be sprayed onto one of the substrates to act as spacers. A thin bead of UV-curable adhesive, e.g., Loctite 3106, (Henkel AG & Co. KGaA, Dusseldorf, Germany) may be applied around the perimeter of one of the substrates, leaving a gap that would serve as a fill port. The two substrates are assembled, pressed together against the spacers to create a uniform gap between the substrates, and then exposed to UV light to cure the adhesive.

Appropriate guest-host mixtures can be prepared for the first cell and the second cell. As discussed, in some cases, the first and second cells may include guest-host mixtures that provide complementary absorbances. In some other cases, the first and second cells may include wide band mixtures that may be approximately the same with respect to chemical compositions and/or concentrations.

The cells can be laminated together using optically clear pressure sensitive adhesive. Each cell may be individually connected to a driving circuitry that could be used to apply a square wave voltage, e.g., with a peak value of 8V at 60 Hz. Alternatively, the cells may be commonly connected to the drive circuitry so that a common voltage may be applied across both cells.

Figure 7:
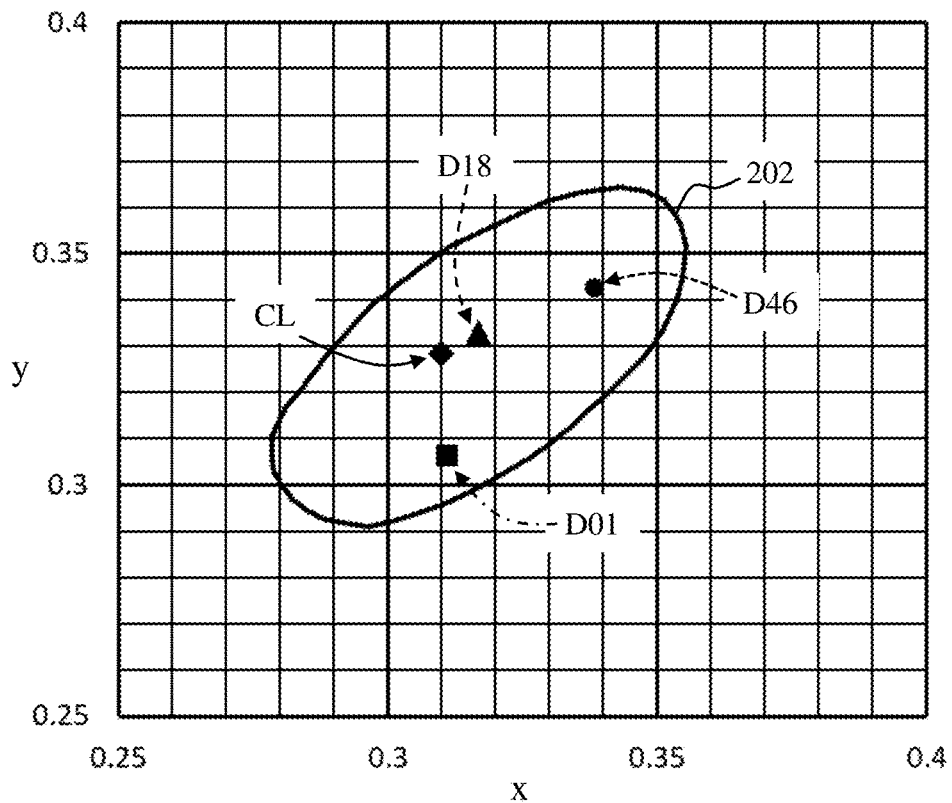
FIG. 7 shows the chromaticity performance for various states of a CP-VTOD within a CIE 1931 x-y color space chromaticity diagram according to some embodiments.

Various single cell wide band devices were constructed, and their electro-optical properties were evaluated. The data from wide band cells provide a model for a CP-VTOD that may employ two such cells to produce spectra and chromaticities such as those shown in FIG. 7 (plots of % T vs wavelength) and FIG. 8 (CIE 1931 x-y chromaticity diagram). Four states are shown including: i) clear state "CL" having a PT % of 73.1%; ii) darkened state "D46" having a PT % of 45.8%; iii) darkened state "D18" having a PT % of 17.6%; and iii) darkened state D01 having a PT % of 1.2%. This CP-VTOD embodiment has at least 3 darkened states. One may consider the first and second darkened states to be D46 and D18, or alternatively D46 and D01, or alternatively D18 and D01—any of these options may qualify as first and second darkened states as described elsewhere herein. In addition, D01 may be considered the "darkest" state.

Regardless of which states are selected as first and second darkened states, as shown in FIG. 8, all of these states are colorimetrically neutral or have low color chromaticity, and their (x,y) color coordinates under Illuminant C fall within neutral region 202 (Munsell value 5, chroma 2—see FIG. 2A and related discussion). Still referring to the chromaticity chart of FIG. 8, and also Table 1, the maximum delta in x for these states is only about 0.03 units and the maximum delta in y is only about 0.04 units.

Figure 6:
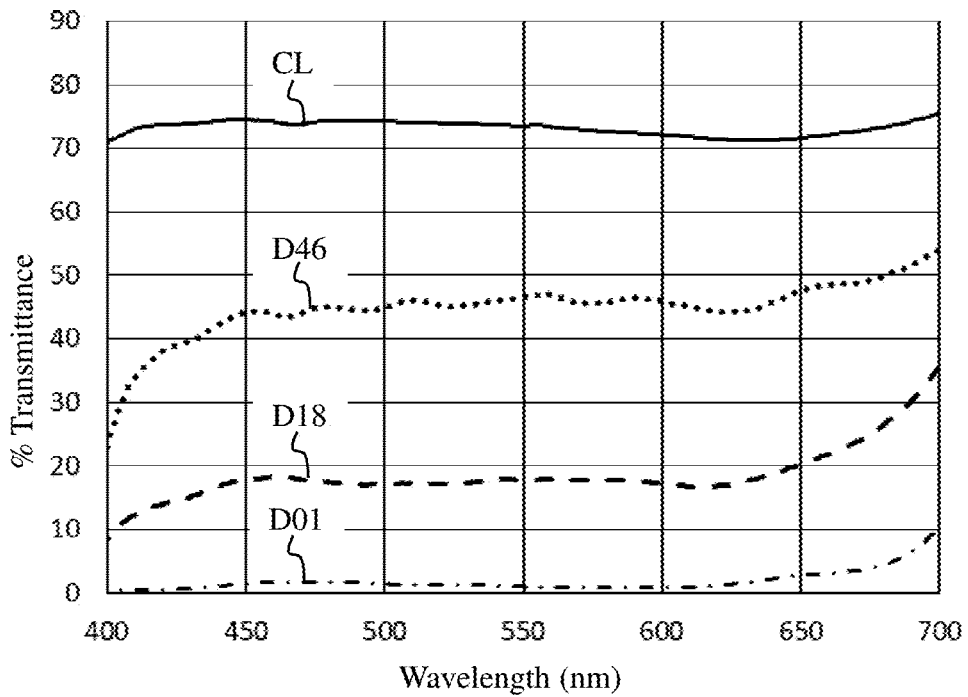
FIG. 6 shows a series of light transmittance spectra for various states of a CP-VTOD according to some embodiments.

Color fidelity index $R_f$ and color gamut index $R_g$ were determined for each state of the CP-VTOD. Specifically, $R_f$ and $R_g$ values associated to the light (Illuminant D65) passing through each of the active configurations (CL, D46, D18, D01) were calculated according to ANSI TM-30-20, and reported in Table 1. With respect to Royer's proposed guidelines mentioned elsewhere herein, $R_f$ and $R_g$ data for samples CL, D46, and D18 are all in the "best" (Tier A) range and in the "acceptable" (Tier C) range even for sample D01. The samples also generally do well against other recommendations found in Table E-2 of ANSI TM-30-20. A neutrality index ("N.I.") was also calculated according to Table VIII of MIL-PRF-32432A, which corresponds to an average percent deviation of spectral transmittance. This specification was designed for light-darkening goggles and visors having a darkened state PT % in a range of 12 to 18%, and the specification calls for an average percent deviation of less than 12%. Sample D18 is the most applicable to the N.I. metric and it easily meets this specification. D46 and CL also meet it. That D01 does not is due to the nature of the test which was not actually designed for low % T regimes. For D01, and referring to FIG. 6, most of the % T values across the spectrum are very low at around 1%, but the filter allows some red light through so that % T is as high as 10% at 700 nm resulting in a high N.I. calculation.

TABLE 1

| Sample | PT % | CIEx | CIEy | N.I. | $R_f$ | $R_g$ |
|--------|------|------|------|------|-------|-------|
| CL | 73.1 | 0.310 | 0.328 | 1.2% | 100 | 100 |
| D46 | 45.8 | 0.338 | 0.343 | 2.0% | 97 | 102 |
| D18 | 17.6 | 0.317 | 0.333 | 7.8% | 97 | 100 |
| D01 | 1.2 | 0.311 | 0.306 | 82% | 72 | 108 |

From Table 1 and the discussion above, the CP-VTODs of the present disclosure provide excellent color duplication/rendering (color preservation) characteristics on transmitted light, whether in a clear state or in multiple darkened states.

Still further embodiments herein include the following enumerated embodiments.

1. A variable transmission optical device ("VTOD") including:
    a first cell including a first electro-optic material provided between a first pair of substrates, wherein the first electro-optic material is capable of changing from a state of higher light transmittance to a state of lower light transmittance in a first wavelength region upon a change in a first electric field applied across the first electro-optical material; and
    a second cell in optical communication with the first cell, the second cell including a second electro-optic material provided between a second pair of substrates, wherein the second electro-optic material is capable of changing from a state of higher light transmittance to a state of lower light transmittance in a second wavelength region upon a change in a second electric field applied across the second electro-optical material,
    wherein the VTOD is switchable between i) a clear state characterized by a photopic transmission $PT_{CS}$ of at least 20% and a color fidelity index $R_{f\text{-}CS}$ greater than or equal to 90, ii) a first darkened state characterized by a photopic transmission $PT_{D1}$ that is reduced by at least 5% relative to $PT_{CS}$ and a color fidelity index $R_{f\text{-}D1}$ greater than or equal to 85, and iii) a second darkened state characterized by a photopic transmission $PT_{D2}$ that is reduced by at least 5% relative to $PT_{D1}$ and a color fidelity index $R_{f\text{-}D2}$ greater than or equal to 70, wherein the color fidelity indices are determined according to ANSI/IES TM-30-20.
2. The VTOD of embodiment 1, wherein $PT_{CS}$ is at least 40%, $PT_{D1}$ is at least 15% and $R_{f\text{-}D1}$ is greater than or equal to 95.
3. The VTOD of embodiment 1 or 2, wherein $PT_{D2}$ is at least 15% and $R_{f\text{-}D2}$ is greater than or equal to 95.

4. The VTOD of embodiment 1 or 2, wherein $PT_{D2}$ between 5% and 15% and $R_{f-D2}$ is greater than or equal to 80.
5. The VTOD of embodiment 1 or 2, wherein $PT_{D2}$ is 5% or less.
6. The VTOD according to any of embodiments 1-5, wherein $PT_{CS}$ is at least 60% and $R_{f-CS}$ is greater than 97.
7. The VTOD according to any of embodiments 1-6, wherein the clear state is characterized by a gamut index $R_{g-CS}$ of at least 90, the first darkened state is characterized by a gamut index $R_{g-D1}$ of at least 90, and the second darkened state is characterized by a gamut index $R_{g-D2}$ of at least 90.
8. The VTOD of embodiment 7, wherein $R_{g-CS}$, $R_{g-D1}$, and $R_{g-D2}$ are each at least 95.
9. A variable transmission optical device ("VTOD") including:
a first cell including a first electro-optic material provided between a first pair of substrates, wherein the first electro-optic material is capable of changing from a state of higher light transmittance to a state of lower light transmittance in a first wavelength region upon a change in a first electric field applied across the first electro-optical material; and
a second cell in optical communication with the first cell, the second cell including a second electro-optic material provided between a second pair of substrates, wherein the second electro-optic material is capable of changing from a state of higher light transmittance to a state of lower light transmittance in a second wavelength region upon a change in a second electric field applied across the second electro-optical material,
wherein:
a) the VTOD is switchable between i) a clear state having chromaticity $C_{CS}$ and a photopic transmission $PT_{CS}$ of at least 20% wherein the first cell and second cell are each in the state of higher light transmission, ii) a first darkened state having chromaticity $C_{D1}$ and a photopic transmission $PT_{D1}$ that is reduced by at least 5% relative to $PT_{CS}$, and iii) a second darkened state having chromaticity $C_{D2}$ and a photopic transmission $PT_{D2}$ that is reduced by at least 5% relative to $PT_{D1}$; and
b) each of chromaticities $C_{CS}$, $C_{D1}$, and $C_{D2}$:
i) as characterized by CIE 1931 x-y color space, has an x coordinate that is within 0.07 units and a y coordinate that is within 0.07 units of the other two chromaticities;
ii) as characterized by CIE 1931 x-y color space, fall within a quadrangle defined by x-y points of A (x=0.286, y=0.270), B (x=0.276, y=0.320), C (x=0.353, y=0.390), and D (x=0.357, y=0.332);
iii) as characterized by Munsell color space, fall within chroma 2 at a Munsell value of 5; or
iv) any combination of (i), (ii), and (iii).
10. The VTOD of embodiment 9, wherein each of chromaticities $C_{CS}$, $C_{D1}$, and $C_{D2}$ has an x coordinate that is within 0.03 units and a y coordinate that is within 0.04 units of the other two chromaticities.
11. The VTOD of embodiment 9 or 10, wherein $PT_{CS}$ is at least 40%, $PT_{D1}$ is reduced by at least 15% relative to $PT_{CS}$, and $PT_{D2}$ is reduced by at least 15% relative to $PT_{D1}$.
12. A variable transmission optical device ("VTOD") including:
a first cell including a first electro-optic material provided between a first pair of substrates, wherein the first electro-optic material is capable of changing from a state of higher light transmittance to a state of lower light transmittance in a first wavelength region upon a change in a first electric field applied across the first electro-optical material; and
a second cell in optical communication with the first cell, the second cell including a second electro-optic material provided between a second pair of substrates, wherein the second electro-optic material is capable of changing from a state of higher light transmittance to a state of lower light transmittance in a second wavelength region upon a change in a second electric field applied across the second electro-optical material,
wherein:
a) the VTOD is switchable between i) a clear state having chromaticity $C_{CS}$ and a photopic transmission $PT_{CS}$ of at least 20% wherein the first cell and second cell are each in the state of higher light transmission, ii) a first darkened state having chromaticity $C_{D1}$ and a photopic transmission $PT_{D1}$ lower than $PT_{CS}$, and iii) a second darkened state having chromaticity $C_{D2}$ and a photopic transmission $PT_{D2}$ that is lower than $PT_{D1}$, and
b) as characterized by Munsell color space i) $PT_{D1}$ corresponds to a Munsell value $MV_{D1}$, ii) $PT_{D2}$ corresponds to a Munsell value $MV_{D2}$, ii) $C_{D1}$ falls within chroma 2 when $MV_{D1}$ is 5 or less, and iv) $C_{D2}$ falls within chroma 2 when $MV_{D2}$ is 5 or less.
13. The optical device of embodiment 12, wherein $C_{CS}$ falls within chroma 2 at a Munsell value of 5.
14. The optical device of embodiment 12 or 13, wherein i) $PT_{D2}$ is less than or equal to $0.5*PT_{D1}$, ii) $PT_{D1}$ is less than or equal to $0.5*PT_{CS}$, or iii) both (i) and (ii).
15. The optical device according to any of embodiments 12-14, wherein $PT_{CS}$ is at least 40% and $PT_{D2}$ is 10% or less.
16. The VTOD according to any of embodiments 1-15, wherein the first electro-optic material includes a first cholesteric liquid crystal ("CLC") host and a first dichroic ("DC") dye or dye mixture, and wherein the second electro-optic material includes a second CLC host and a second DC dye mixture including two or more dyes, wherein the dyes of the second DC dye mixture are each characterized by i) a dye order parameter ($S2_{dye}$) that is within 30% of any other dye of the second DC dye mixture, ii) a dichroic ratio ($DR2_{dye}$) that is within 30% of any other dye of the second DC dye mixture, or iii) both (i) and (ii).
17. The VTOD of embodiment 16, wherein the first DC dye mixture includes at least two dyes each characterized by a dye order parameter ($S1_{dye}$) and a dichroic ratio ($DR1_{dye}$), such that i) $S1_{dye}$ of each dye is within 30% of any other dye of the first DC dye mixture, ii) $DR1_{dye}$ is within 30% of any other dye of the first DC dye mixture, or iii) both (i) and (ii).
18. The VTOD of embodiment 17, wherein for dyes within the first and second DC dye mixtures: (i) the $S1_{dye}$ and $S2_{dye}$ values are within 30% of each other, or (ii) the $DR1_{dye}$ and $DR2_{dye}$ values are within 30% of each other, or (iii) both (i) and (ii).
19. The VTOD according to any of embodiments 1-18, wherein the second wavelength region is complementary to the first wavelength region, and wherein switching between the states includes changing both the first and second electric fields.
20. The VTOD of embodiment 19, wherein the first and second electric fields are commonly controlled.
21. The VTOD of according to any of embodiments 1-18, wherein the second wavelength region is substantially the same as the first wavelength region, and both the first and second cells are characterized as having a wide band absorption profile when in a state of lower light transmittance.
22. The VTOD of embodiment 21, wherein switching between the clear state and the first darkened state includes changing only one of the first and second electric fields.
23. The VTOD of embodiment 21, wherein switching between the clear state and the first darkened state includes changing both the first and second electric fields.
24. The VTOD of embodiment 23, wherein the first and second electric fields are commonly controlled.
25. The VTOD according to any of embodiments 1-24, wherein the first cell includes a first alignment layer and the second cell includes a second alignment layer, and wherein an orientation of the first alignment layer is rotated by 70-110 degrees relative to an orientation of the second alignment layer.
26. A method of operating a VTOD, the method including: providing a VTOD including:
a first cell including a first electro-optic material provided between a first pair of substrates, wherein the first electro-optic material is capable of changing from a state of higher light transmittance to a state of lower light transmittance in a first wavelength region upon a change in a first electric field applied across the first electro-optical material; and
a second cell in optical communication with the first cell, the second cell including a second electro-optic material provided between a second pair of substrates, wherein the second electro-optic material is capable of changing from a state of higher light transmittance to a state of lower light transmittance in a second wavelength region upon a change in a second electric field applied across the second electro-optical material; and
changing at least the second electric field to switch the VTOD from i) a clear state having chromaticity $C_{CS}$ and a photopic transmission $PT_{CS}$ of at least 20% to ii) a first darkened state having chromaticity $C_{D1}$ and a light transmission that is reduced by at least 5% in the first and second wavelength regions relative to the clear state,
wherein:
i) as characterized by CIE 1931 x-y color space, $C_{D1}$ has an x coordinate that is within 0.07 units and a y coordinate that is within 0.07 units of $C_{CS}$;
ii) as characterized by CIE 1931 x-y color space, $C_{D1}$ and $C_{CS}$ fall within a quadrangle defined by x-y points of A (x=0.286, y=0.270), B (x=0.276, y=0.320), C (x=0.353, y=0.390), and D (x=0.357, y=0.332);
iii) as characterized by Munsell color space, $C_{D1}$ and $C_{CS}$ fall within chroma 2 at a Munsell value of 5; or
iv) any combination of (i), (ii), and (iii).
27. The method of embodiment 26, further including changing at least the first electric field to switch the VTOD from the clear state to the first darkened state.
28. The method of embodiment 27, wherein the second wavelength region is complementary to the first wavelength region.
29. The method of embodiment 26 or 27, wherein the second wavelength region is substantially the same as the first wavelength region, and both the first and second cells are characterized as having a wide band absorption profile when in a state of lower light transmittance.

30. The method according to any of embodiments 26-29, further including changing the first electric field or both the first and second electric fields to switch the VTOD to a second darkened state having chromaticity $C_{D2}$ and a photopic transmission $PT_{D2}$ that is reduced by at least 5% relative to $PT_{D1}$,
wherein:
i) as characterized by CIE 1931 x-y color space, $C_{D2}$ has an x coordinate that is within 0.07 units and a x coordinate that is within 0.07 units of $C_{D1}$;
ii) as characterized by CIE 1931 x-y color space, $C_{D2}$ falls within a quadrangle defined by x-y points of A (x=0.286, y=0.270), B (x=0.276, y=0.320), C (x=0.353, y=0.390), and D (x=0.357, y=0.332);
iii) as characterized by Munsell color space, $C_{D2}$ falls within chroma 2 at a Munsell value of 5; or
iv) any combination of (i), (ii), and (iii).
31. The method according to any of embodiments 26-30, wherein the first and second electric fields are commonly controlled.
32. The method of embodiment 30 or 31, wherein $PT_{CS}$ is at least 40%, $PT_{D1}$ is reduced by at least 15% relative to $PT_{CS}$, and $PT_{D2}$ is reduced by at least 15% relative to $PT_{D1}$.
33. A method of operating a VTOD, the method including: providing a VTOD including:
a first cell including a first electro-optic material provided between a first pair of substrates, wherein the first electro-optic material is capable of changing from a state of higher light transmittance to a state of lower light transmittance in a first wavelength region upon a change in a first electric field applied across the first electro-optical material; and
a second cell in optical communication with the first cell, the second cell including a second electro-optic material provided between a second pair of substrates, wherein the second electro-optic material is capable of changing from a state of higher light transmittance to a state of lower light transmittance in a second wavelength region upon a change in a second electric field applied across the second electro-optical material; and
changing at least the second electric field to switch the VTOD from a clear state having chromaticity $C_{CS}$ and a photopic transmission $PT_{CS}$ of at least 20% to a first darkened state having chromaticity $C_{D1}$ and a photopic transmission $PT_{D1}$ lower than $PT_{CS}$,
wherein, as characterized by Munsell color space, $PT_{D1}$ corresponds to a Munsell value $MV_{D1}$ and $C_{D1}$ falls within chroma 2 when $MV_{D1}$ is 5 or less.
34. The method of embodiment 33, further including changing at least the first electric field to switch the VTOD from the clear state to the first darkened state.
35. The method of embodiment 34, wherein the second wavelength region is complementary to the first wavelength region.
36. The method of embodiment 33, wherein the second wavelength region is substantially the same as the first wavelength region, and both the first and second cells are characterized as having a wide band absorption profile when in a state of lower light transmittance.
37. The method according to any of embodiments 33-36, further including changing the first electric field or both the first and second electric fields to switch the VTOD to a second darkened state having chromaticity $C_{D2}$ and a photopic transmission $PT_{D2}$ that is lower than $PT_{D1}$, wherein $PT_{D2}$ corresponds to a Munsell value $MV_{D2}$ and $C_{D2}$ falls within chroma 2 when $MV_{D2}$ is 5 or less.

38. The method according to any of claims 33-37, wherein the first and second electric fields are commonly controlled.

39. An article of manufacture including an CP-VTOD according to any of embodiments 1-25, wherein the article of manufacture includes a camera filter, eyewear, a visor, goggles, a face shield, an AR/VR headset, a near-eye display, a window, a windshield, a sunroof, a heads-up display, or an optical instrument.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of example embodiments of the invention has been presented for the purposes of illustration and description. It is not intended to be exhaustive or to limit the invention to the precise form described, and many modifications and variations are possible in light of the teaching above.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Additionally, details of any specific embodiment may not always be present in variations of that embodiment or may be added to other embodiments.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither, or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a method" includes a plurality of such methods and reference to "the layer" includes reference to one or more layers and equivalents thereof known to those skilled in the art, and so forth. The invention has now been described in detail for the purposes of clarity and understanding. However, it will be appreciated that certain changes and modifications may be practiced within the scope of the appended claims.

All publications, patents, and patent applications cited herein are hereby incorporated by reference in their entirety for all purposes. None is admitted to be prior art.

What is claimed is:

1. A variable transmission optical device ("VTOD") comprising:
    a first cell comprising a first electro-optic material provided between a first pair of substrates, wherein the first electro-optic material is capable of changing from a state of higher light transmittance to a state of lower light transmittance in a first wavelength region upon a change in a first electric field applied across the first electro-optical material; and
    a second cell in optical communication with the first cell, the second cell comprising a second electro-optic material provided between a second pair of substrates, wherein the second electro-optic material is capable of changing from a state of higher light transmittance to a state of lower light transmittance in a second wavelength region upon a change in a second electric field applied across the second electro-optical material,
    wherein:
    a) for light from a scene passing through the VTOD to be viewed, the VTOD is switchable between i) a clear state having chromaticity $C_{CS}$ and a photopic transmission $PT_{CS}$ of at least 20% wherein the first cell and second cell are each in the state of higher light transmission, ii) a first darkened state having chromaticity $C_{D1}$ and a photopic transmission $PT_{D1}$ lower than $PT_{CS}$, and iii) a second darkened state having chromaticity $C_{D2}$ and a photopic transmission $PT_{D2}$ that is lower than $PT_{D1}$, and
    b) as characterized by Munsell color space i) $PT_{D1}$ corresponds to a Munsell value $MV_{D1}$, ii) $PT_{D2}$ corresponds to a Munsell value $MV_{D2}$, iii) $C_{D1}$ falls within chroma 2 when $MV_{D1}$ is 5 or less, and iv) $C_{D2}$ falls within chroma 2 when $MV_{D2}$ is 5 or less.

2. The VTOD of claim 1, wherein $C_{CS}$ falls within chroma 2 at a Munsell value of 5.

3. The VTOD of claim 1, wherein i) $PT_{D2}$ is less than or equal to $0.5*PT_{D1}$, ii) $PT_{D1}$ is less than or equal to $0.5*PT_{CS}$, or iii) both (i) and (ii).

4. The VTOD of claim 1, wherein $PT_{CS}$ is at least 40% and $PT_{D2}$ is 10% or less.

5. The VTOD of claim 1, wherein the first electro-optic material comprises a first cholesteric liquid crystal ("CLC") host and a first dichroic ("DC") dye or dye mixture, and wherein the second electro-optic material comprises a second CLC host and a second DC dye mixture comprising two or more dyes, wherein the dyes of the second DC dye mixture are each characterized by i) a dye order parameter ($S2_{dye}$) that is within 30% of any other dye of the second DC dye mixture, ii) a dichroic ratio ($DR2_{dye}$) that is within 30% of any other dye of the second DC dye mixture, or iii) both (i) and (ii).

6. The VTOD of claim 5, wherein the first DC dye mixture comprises at least two dyes each characterized by a dye order parameter ($S1_{dye}$) or a dichroic ratio ($DR1_{dye}$), such that i) $S1_{dye}$ of each dye is within 30% of any other dye of the first DC dye mixture, ii) $DR1_{dye}$ is within 30% of any other dye of the first DC dye mixture, or iii) both (i) and (ii).

7. The VTOD of claim 6, wherein for dyes within the first and second DC dye mixtures: (i) the $S1_{dye}$ and $S2_{dye}$ values are within 30% of each other, or (ii) the $DR1_{dye}$ and $DR2_{dye}$ values are within 30% of each other, or (iii) both (i) and (ii).

8. The VTOD of claim 1, wherein the second wavelength region is complementary to the first wavelength region, and wherein switching between the states comprises changing both the first and second electric fields.

9. The VTOD of claim 8, wherein the first and second electric fields are commonly controlled.

10. The VTOD of claim 1, wherein the second wavelength region is substantially the same as the first wavelength region, and both the first and second cells are characterized as having a wide band absorption profile when in a state of lower light transmittance.

11. The VTOD of claim 10, wherein switching between the clear state and the first darkened state comprises changing only one of the first and second electric fields.

12. The VTOD of claim 10, wherein switching between the clear state and the first darkened state comprises changing both the first and second electric fields.

13. The VTOD of claim 12, wherein the first and second electric fields are commonly controlled.

14. The VTOD of claim 1, wherein the first cell comprises a first alignment layer and the second cell comprises a second alignment layer, and wherein an orientation of the first alignment layer is rotated by 70-110 degrees relative to an orientation of the second alignment layer.

15. A method of operating a VTOD, the method comprising:
providing a VTOD comprising:
a first cell comprising a first electro-optic material provided between a first pair of substrates, wherein the first electro-optic material is capable of changing from a state of higher light transmittance to a state of lower light transmittance in a first wavelength region upon a change in a first electric field applied across the first electro-optical material; and
a second cell in optical communication with the first cell, the second cell comprising a second electro-optic material provided between a second pair of substrates, wherein the second electro-optic material is capable of changing from a state of higher light transmittance to a state of lower light transmittance in a second wavelength region upon a change in a second electric field applied across the second electro-optical material; and
changing at least the second electric field to, with respect to light from a scene passing through the VTOD to be viewed, switch the VTOD from a clear state having chromaticity $C_{CS}$ and a photopic transmission $PT_{CS}$ of at least 20% to a first darkened state having chromaticity $C_{D1}$ and a photopic transmission $PT_{D1}$ lower than $PT_{CS}$,
wherein, as characterized by Munsell color space, $PT_{D1}$ corresponds to a Munsell value $MV_{D1}$ and $C_{D1}$ falls within chroma 2 when $MV_{D1}$ is 5 or less.

16. The method of claim 15, further comprising changing the first electric field to, with respect to light from a scene passing through the VTOD to be viewed, switch the VTOD from the clear state to the first darkened state.

17. The method of claim 16, wherein the second wavelength region is complementary to the first wavelength region.

18. The method of claim 15, wherein the second wavelength region is substantially the same as the first wavelength region, and both the first and second cells are characterized as having a wide band absorption profile when in a state of lower light transmittance.

19. The method of claim 15, further comprising changing the first electric field or both the first and second electric fields to, with respect to light from a scene passing through the VTOD to be viewed, switch the VTOD to a second darkened state having chromaticity $C_{D2}$ and a photopic transmission $PT_{D2}$ that is lower than $PT_{D1}$, wherein $PT_{D2}$ corresponds to a Munsell value $MV_{D2}$ and $C_{D2}$ falls within chroma 2 when $MV_{D2}$ is 5 or less.

20. The method of claim 15, wherein the first and second electric fields are commonly controlled.

21. A variable transmission optical device ("VTOD") comprising:
a first cell comprising a first liquid crystal material provided between a first pair of substrates, wherein the first liquid crystal material is capable of changing from a state of higher light transmittance to a state of lower light transmittance in a first wavelength region upon a change in a first electric field applied across the first electro-optical material; and
a second cell in optical communication with the first cell, the second cell comprising a second liquid crystal material provided between a second pair of substrates, wherein the second liquid crystal material is capable of changing from a state of higher light transmittance to a state of lower light transmittance in a second wavelength region upon a change in a second electric field applied across the second electro-optical material,
wherein:
a) the VTOD is switchable between i) a clear state having chromaticity $C_{CS}$ and a photopic transmission $PT_{CS}$ of at least 20% wherein the first cell and second cell are each in the state of higher light transmission, ii) a first darkened state having chromaticity $C_{D1}$ and a photopic transmission $PT_{D1}$ lower than $PT_{CS}$, and iii) a second darkened state having chromaticity $C_{D2}$ and a photopic transmission $PT_{D2}$ that is lower than $PT_{D1}$, and
b) the VTOD provides a colorimetrically neutral chromaticity in the first and second darkened states, characterized as follows:
i) when $PT_{D1}$, $PT_{D2}$, or both $PT_{D1}$ and $PT_{D2}$ are approximately 12.0%-19.8%, the respective chromaticity $C_{D1}$, $C_{D2}$, or both $C_{D1}$ and $C_{D2}$ fall within neutral region 212 of FIG. 2B;
ii) when $PT_{D1}$, $PT_{D2}$, or both $PT_{D1}$ and $PT_{D2}$ are approximately 6.6%-12.0%, the respective chromaticity $C_{D1}$, $C_{D2}$, or both $C_{D1}$ and $C_{D2}$ fall within neutral region 222 of FIG. 2B;
iii) when $PT_{D1}$, $PT_{D2}$, or both $PT_{D1}$ and $PT_{D2}$ are approximately 3.1%-6.6%, the respective chromaticity $C_{D1}$, $C_{D2}$, or both $C_{D1}$ and $C_{D2}$ fall within neutral region 232 of FIG. 2B; and
iv) when $PT_{D1}$, $PT_{D2}$, or both $PT_{D1}$ and $PT_{D2}$ are approximately 1.2%-3.1%, the respective chromaticity $C_{D1}$, $C_{D2}$, or both $C_{D1}$ and $C_{D2}$ fall within neutral region 242 of FIG. 2B.

22. The VTOD of claim 21, wherein the second wavelength region is complementary to the first wavelength region, and wherein switching between the states comprises changing both the first and second electric fields.

23. The VTOD of claim 22, wherein the first and second electric fields are commonly controlled.

24. The VTOD of claim 21, wherein the second wavelength region is substantially the same as the first wavelength region, and both the first and second cells are characterized as having a wide band absorption profile when in a state of lower light transmittance.

25. The VTOD of claim 24, wherein switching between the clear state and the first darkened state comprises changing only one of the first and second electric fields.

26. The VTOD of claim 24, wherein switching between the clear state and the first darkened state comprises changing both the first and second electric fields.

27. The VTOD of claim 26, wherein the first and second electric fields are commonly controlled.

28. An article of manufacture including the VTOD of claim 21, wherein the article of manufacture includes a camera filter, eyewear, a visor, goggles, a face shield, an AR/VR headset, a window, a windshield, a sunroof, or a heads-up display.

29. An article of manufacture including the VTOD of claim 1, wherein the article of manufacture includes a camera filter, eyewear, a visor, goggles, a face shield, an AR/VR headset, a window, a windshield, a sunroof, or a heads-up display.

* * * * *